(12) United States Patent
Shimoda et al.

(10) Patent No.: US 7,649,687 B2
(45) Date of Patent: Jan. 19, 2010

(54) REFLECTIVE SCREEN

(75) Inventors: Kazuhito Shimoda, Kanagawa (JP); Shunichi Kajiya, Miyagi (JP); Takashi Watanabe, Miyagi (JP); Masayasu Kakinuma, Miyagi (JP); Hiroyuki Kiso, Miyagi (JP); Hideya Chubachi, Miyagi (JP); Hiroshi Hayashi, Miyagi (JP); Ken Hosoya, Miyagi (JP); Akiko Murakami, Miyagi (JP); Ko Ishikawa, Miyagi (JP); Shinichi Kondo, Miyagi (JP)

(73) Assignee: Sony Corporation, Tokyo (JP)

( * ) Notice: Subject to any disclaimer, the term of this patent is extended or adjusted under 35 U.S.C. 154(b) by 564 days.

(21) Appl. No.: 11/474,608

(22) Filed: Jun. 26, 2006

(65) Prior Publication Data

US 2007/0035827 A1    Feb. 15, 2007

(30) Foreign Application Priority Data

Jun. 28, 2005  (JP) .............................. 2005-188247
Jun. 19, 2006  (JP) .............................. 2006-168654

(51) Int. Cl.
    *G03B 21/56*    (2006.01)
(52) U.S. Cl. ..................................... 359/449
(58) Field of Classification Search ................. 359/449, 359/455–457, 459
    See application file for complete search history.

(56) References Cited

U.S. PATENT DOCUMENTS

| 6,574,041 | B1 * | 6/2003 | Chen ........................... 359/459 |
| 6,842,282 | B2 * | 1/2005 | Kuroda et al. ............... 359/449 |
| 7,139,123 | B2 * | 11/2006 | Chubachi et al. ............ 359/449 |
| 2002/0163719 | A1 * | 11/2002 | Ma et al. ..................... 359/443 |

FOREIGN PATENT DOCUMENTS

| JP | 10-039418 | 2/1998 |
| JP | 10-282577 | 10/1998 |
| JP | 2976148 | 9/1999 |
| JP | 2984801 | 10/1999 |
| JP | 3655972 | 3/2005 |

\* cited by examiner

*Primary Examiner*—Christopher Mahoney
(74) *Attorney, Agent, or Firm*—Wolf, Greenfield & Sacks, P.C.

(57) ABSTRACT

A reflective screen includes a light reflecting layer, and a light diffusing layer provided on the light reflecting layer. The light diffusing layer has the diffusion property that in one (A axis) of two perpendicular axial directions on a light diffusion plane, a luminance distribution curve versus incidence angle is asymmetric with respect to the zero-incidence-angle axis, and the side on which the incidence angle (half-luminance incidence angle) with half of a peak luminance on the A axis in the normal direction to the screen plane is small faces in a direction in which external light has the highest strength.

21 Claims, 19 Drawing Sheets

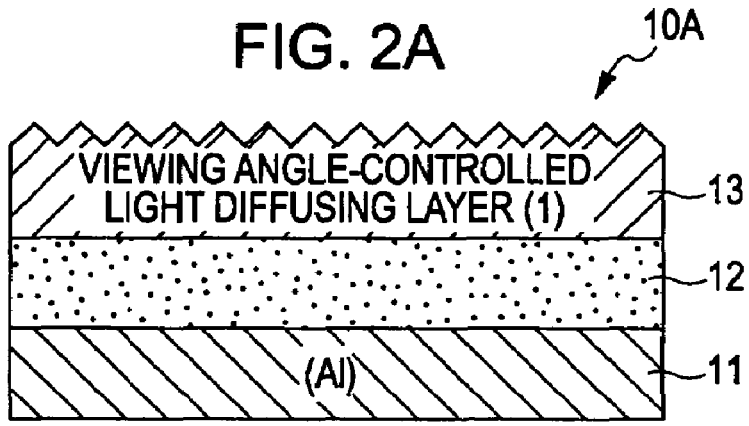
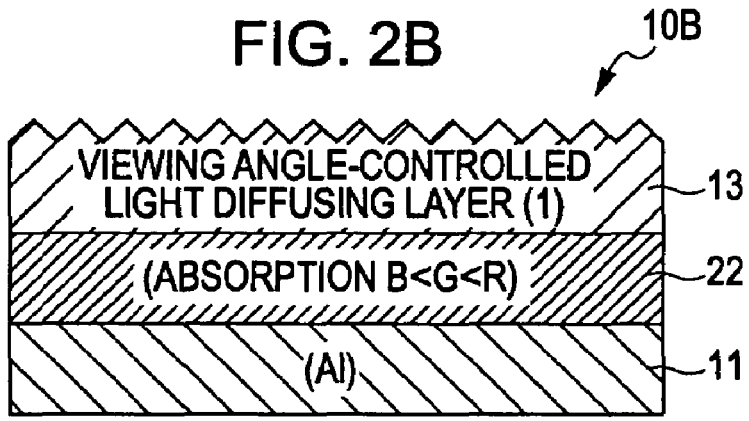
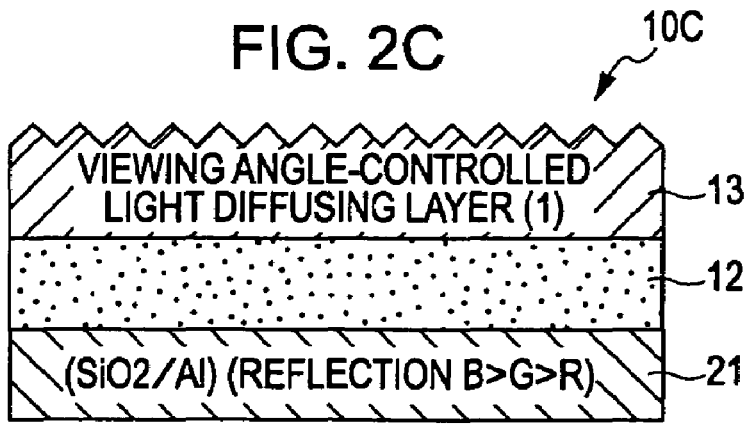

$\theta$ RANGE: $(r-2\pi)$ TO $r$ $\theta$ RANGE: $(r-2\pi)$ TO $r$

REFLECTIVE SCREEN

CROSS REFERENCES TO RELATED APPLICATIONS

The present invention contains subject matter related to Japanese Patent Application JP 2005-188247 filed in the Japanese Patent Office on Jun. 28, 2005 and Japanese Patent Application JP 2006-168654 filed in the Japanese Patent Office on Jun. 19, 2006, the entire contents of which are incorporated herein by reference.

BACKGROUND OF THE INVENTION

1. Field of the Invention

The present invention relates to a reflective screen.

2. Description of the Related Art

Reflective screens having the reflection property of reflecting light from projectors and the diffusion property of diffusing reflected light are used as screens for projectors such as OHP (Over Head Projectors), slides, motion picture projectors, and the like. The most general screen includes a laminate of a black backing sheet and a white poly(vinyl chloride) sheet used as a light reflecting base material. There have also been used reflective screens each including a light reflecting base material and a reflecting layer formed thereon by coating white ink containing a pearl pigment or an aluminum paste pigment, the screens being further roughened by micro processing to improve reflectance. However, in these screens, consideration has not been not given to improvement in the contrast ratio between a black dark picture portion and a white bright picture portion, and thus use of the screens have been limited to use in darkrooms in order to achieve clear images.

Accordingly, there has been proposed a reflective screen improved in contrast ratio to achieve clear images even in environments in which illuminating light from a ceiling and light from a window are present. An example of the proposed screen is one in which an eaves including a light-absorbing material called a "glaze" is provided for preventing absorption of projector light incident from the front side, but external light at an incidence angle is absorbed (refer to, for example, Japanese Unexamined Patent Application Publication No. 10-39418). There has also been proposed a screen in which a black fibrous material is used for a light absorbing layer, for achieving the same effect as the eaves (refer to, for example, Japanese Unexamined Patent Application Publication No. 10-282577).

There has been further disclosed a screen in which a geometrical relation between a Fresnel lens shape, the screen, and an observer is controlled to avoid reflected light of external light incident from above from entering the eyes of the observer (refer to, for example, Japanese Patent No. 3655972).

There has been further disclosed a screen in which the inclined surface of a Fresnel lens is used as a reflecting surface, and a rack surface is used as a light absorbing surface, thereby improving contrast even under external light (refer to, for example, Japanese Patent Nos. 2976148 and 2984801).

SUMMARY OF THE INVENTION

However, all the above-mentioned screens have complicated structures, and thus fundamental solution has not yet been achieved. For example, Japanese Unexamined Patent Application Publication No. 10-39418 discloses only the idea that a light absorbing material is disposed on an incidence surface for external light, not disclose a resolution with the view of a diffusion angle. Japanese Unexamined Patent Application Publication No. 10-282577 discloses that a light diffusing layer is disposed as a surface layer, but has the problem of deviating the reflected color of projector light due to the light diffusing layer in which the reflection spectrum decreases toward the shorter wavelength side, as compared with general screens. In addition, Japanese Patent Nos. 3655972, 2976148, and 2984801 each use a Fresnel lens and thus have limitations to the diffusion angle and the screen size due to the shape of the Fresnel lens.

It is desirable to provide a reflective screen capable of displaying an image with a high contrast and little deviation in white balance.

A reflective screen according to an embodiment of the present invention includes a light reflecting layer and a light diffusing layer provided on the light reflecting layer, wherein the light diffusing layer has the diffusion property that in one (A axis) of two perpendicular axial directions of a light diffusion plane, a luminance distribution curve versus incidence angle is asymmetric with respect to the zero-incidence-angle axis, and a side with a small incidence angle on the A axis (half-luminance incidence angle) at which the luminance is half of a peak luminance in the normal direction to the screen plane faces in a direction in which external light has the highest strength. In other words, the reflective screen includes a light reflecting layer and a light diffusing layer provided on the light reflecting layer, wherein the light diffusing layer has the diffusion property that in one (A axis) of two perpendicular axial directions of a light diffusion plane, an incidence angle (half-luminance incidence angle) at which luminance is half of a peak luminance in the normal direction to the screen plane is different on the positive-incidence-angle side and the-negative-incidence angle side of the zero-incidence-angle axis on the A axis, and the side with a small half-luminance incidence angle on the A axis faces in a direction in which external light has the highest strength.

Since an external light source is frequently disposed on the ceiling in a room, the light diffusing layer is preferably disposed so that the A axis direction coincides with the vertical direction of the screen, and the side with a small half-luminance incidence angle is disposed in an upper portion of the screen in the vertical direction.

In the light diffusing layer, preferably, the diffusion angle in the horizontal direction of the screen is different from that in the vertical direction of the screen. From the viewpoint of the viewing angle, preferably, the diffusion angle in the screen horizontal direction is large, and the diffusion angle in the screen vertical direction is smaller than that in the screen horizontal direction.

The light diffusing layer is preferably composed of a light transmitting resin having irregularity on a surface thereof, and the irregularity is preferably formed by transferring the shape of a mold surface which is formed by sand blasting.

The light reflecting layer preferably has a surface composed of Al, Ag, Ti, Nb, Ni, Cr, Fe, or an alloy thereof (FIG. 2A). The light reflecting layer preferably has a surface composed of Al, Ag, or an alloy thereof and having high reflectance and small dependency on wavelengths. However, when the screen has a high grain, another material such as Ti or Nb which has lower reflectance than that of Al and Ag may be used for controlling the gain. Therefore, the light reflecting layer may include a metal plate or metal film composed of Al, Ag, Ti, Nb, Ni, Cr, Fe, or an alloy thereof, or a substrate coated with such a metal.

The reflective screen preferably further includes a light absorbing layer provided between the light reflecting layer and the light diffusing layer, for absorbing part of transmitted light (FIG. 2B).

The light absorption properties of the light absorbing layer are preferably controlled according to the reflection properties of the light reflecting layer. Since the reflection spectrum of the light diffusing layer generally decreases toward the shorter wavelength side, the reflectance of the screen may be made uniform in the visible region by decreasing the absorptance of the light absorbing layer toward the shorter wavelength side. Specifically, the light absorbing layer has a light absorption property represented by the relation of (absorptance in blue wavelength region)<(absorptance in green wavelength region)<(absorptance in red wavelength region). In this case, the blue wavelength region ranges from a wavelength of 450 nm to less than 500 nm, the green wavelength region ranges from a wavelength of 500 nm to less than 600 nm, and the red wavelength region ranges from a wavelength of 600 nm to less than 650 nm.

Furthermore, the light absorbing layer is preferably composed of an adhesive agent containing a pigment.

The light reflecting layer preferably includes an optical laminated film containing a metal film and a metal oxide thin film (FIG. 2C).

In addition, the light reflection properties of the light reflecting layer are preferably controlled according to the reflection properties of the light diffusing layer. Since the reflection spectrum of the light diffusing layer generally decreases toward the shorter wavelength side, the reflectance of the screen may be made uniform in the visible region by increasing the reflectance of the light reflecting layer toward the shorter wavelength side. Specifically, the light reflecting layer has a light reflection property represented by the relation of (reflectance in blue wavelength region)>(reflectance in green wavelength region)>(reflectance in red wavelength region). In this case, the reflection property may be controlled by controlling the thickness of the metal oxide thin film. The blue wavelength region ranges from a wavelength of 450 nm to less than 500 nm, the green wavelength region ranges from a wavelength of 500 nm to less than 600 nm, and the red wavelength region ranges from a wavelength of 600 nm to less than 650 nm.

Furthermore, the metal oxide thin film is preferably a dielectric film composed of $Nb_2O_5$, $TiO_2$, $Ta_2O_5$, $Al_2O_3$, or $SiO_2$, or a conductive film composed of $In_2O_3$, $SnO_2$, $ZnO$, an $In_2O_3$—$SnO_2$ compound, or a material doped with any one of these metals.

A reflective screen according to another embodiment of the present invention includes a light diffusing layer and a light reflecting layer provided on the light diffusing layer, wherein the light diffusing layer has the diffusion property that in one (A axis) of two perpendicular axial directions on a light diffusion plane, a luminance distribution curve versus incidence angle is asymmetric with respect to the zero-incidence-angle axis, and a side with a small incidence angle on the A axis (half-luminance incidence angle) at which the luminance is half of a peak luminance in the normal direction to the screen plane faces in a direction in which external light has the highest strength. In other words, the reflective screen includes a light diffusing layer and a light reflecting layer provided on the light diffusing layer, wherein in one (A axis) of two perpendicular axial directions on a light diffusion plane of the light diffusing layer, an angle (half-luminance incidence angle) at which luminance is half of a peak luminance in the normal direction to the screen plane is different on the positive-incidence-angle side and the negative-incidence-angle side of the zero-incidence-angle axis on the A axis, and the side with a small half-luminance incidence angle on the A axis faces in a direction in which external light has the highest strength.

With respect to the diffusion properties on the side of the light diffusing layer in which the half-luminance incidence angle on the A axis is small, the luminance in the direction normal to the screen plane is preferably $\frac{1}{10}$ or less of the peak luminance at an incidence angle of the sum of the half-luminance incidence angle and an angle of about 0 to 20 degrees. Furthermore, with respect to the diffusion properties on the side of the light diffusing layer in which the half-luminance incidence angle on the A axis is large and the diffusion properties in the other axial direction of the two perpendicular axial directions on the light diffusion plane, the luminance in the direction normal to the screen plane is preferably $\frac{1}{10}$ or less of the peak luminance at an incidence angle of the sum of the half-luminance incidence angle and an angle of about 0 to 20 degrees.

With respect to the diffusion properties of the light diffusing layer, the peak luminance in the A axis direction preferably shifts to the side in which the half-luminance incidence angle on the A axis is large.

In addition, since an external light source is frequently disposed on the ceiling in a room, the light diffusing layer is preferably disposed so that the A axis direction coincides with the vertical direction of the screen, and the side with a small half-luminance incidence angle is located in an upper portion of the screen in the vertical direction.

In the light diffusing layer, preferably, the diffusion angle in the horizontal direction of the screen is different from that in the vertical direction of the screen. From the viewpoint of the viewing angle, preferably, the diffusion angle in the screen horizontal direction is large, and the diffusion angle in the screen vertical direction is smaller than that in the screen horizontal direction.

The light diffusing layer is preferably composed of a resin having irregularity in the surface thereof, and the irregularity is preferably formed by transferring the shape of a mold surface which is formed by sand blasting. The resin may be ultraviolet curable and thus may have such a degree of light transmittance that ultraviolet light is slightly transmitted.

In this case, the surface of the light diffusing layer preferably has irregularity in a form in which micro surface elements each including a part of a substantially ellipsoidal element are assembled, the micro surface elements having random sizes and/or a random arrangement. The micro surface elements preferably have a concave or convex shape asymmetric with respect to the normal line to the screen plane. Furthermore, the irregularity pitch of the surface of the light diffusing layer is preferably 1 mm or less.

The irregularity shape of the surface of the light diffusing layer is preferably controlled by controlling the injection angle of an abrasive material from a blast gun with respect to the mold surface in the sand blasting.

The surface of the light reflecting layer is preferably composed of Al, Ag, Ti, Nb, Ni, Cr, Fe, or an alloy thereof (FIG. 4D).

In addition, a light absorbing layer is preferably provided on the light reflecting layer, for absorbing part of transmitted light (FIG. 4E).

The light absorption properties of the light absorbing layer are preferably controlled according to the reflection properties of the light diffusing layer. Since the reflection spectrum of the light diffusing layer generally decreases toward the shorter wavelength side, the reflectance of the screen may be made uniform in the visible region by decreasing the absorptance of the light absorbing layer toward the shorter wavelength side. Specifically, the light absorbing layer has a light absorption property represented by the relation of (absorptance in blue wavelength region)<(absorptance in green wavelength region)<(absorptance in red wavelength region). In this case, the blue wavelength region ranges from 450 nm to less than 500 nm, the green wavelength region ranges from 500 nm to less than 600 nm, and the red wavelength region ranges from 600 nm to less than 650 nm.

Furthermore, the light absorbing layer is preferably composed of a resin containing a pigment because it is disposed as the uppermost layer.

The light reflecting layer preferably includes an optical laminated film containing a metal film and a metal oxide thin film (FIG. 4F).

In addition, the light reflection properties of the light reflecting layer are preferably controlled according to the reflection properties of the light diffusing layer. Since the reflection spectrum of the light diffusing layer generally decreases toward the shorter wavelength side, the reflectance of the screen may be made uniform in the visible region by increasing the reflectance of the light reflecting layer toward the shorter wavelength side. Specifically, the light reflecting layer has a light reflection property represented by the relation of (reflectance in blue wavelength region)>(reflectance in green wavelength region)>(reflectance in red wavelength region). In this case, the blue wavelength region ranges from a wavelength of 450 nm to less than 500 nm, the green wavelength region ranges from 500 nm to less than 600 nm, and the red wavelength region ranges from 600 nm to less than 650 nm.

Furthermore, the metal oxide thin film is preferably a dielectric film composed of $Nb_2O_5$, $TiO_2$, $Ta_2O_5$, $Al_2O_3$, or $SiO_2$, or a conductive film composed of $In_2O_3$, $SnO_2$, $ZnO$, an $In_2O_3$—$SnO_2$ compound, or a material doped with any one of these metals.

A take-up reflective screen according to still another embodiment of the present invention includes any one of the above-mentioned reflective screens and a cylindrical winding shaft fixed to one end of the reflective screen, wherein the outer peripheral surface of the winding shaft has a step corresponding to the total thickness of the reflective screen and a joint member, and the outer peripheral surface is a continuous surface, excluding the step, satisfying the following equation:

$$r = a \times \theta$$

(wherein $a = b/2\pi$ (constant), $\theta = (r_{max} - 2\pi) \sim r_{max}$, b is the height of the step, r is the radius of the outer peripheral surface of the winding shaft, and $r_{max}$ is the outermost radius (mm) of the winding shaft).

A take-up reflective screen according to a further embodiment of the present invention includes any one of the above-mentioned reflective screens and a cylindrical winding shaft fixed to one end of the reflective screen, wherein the outer peripheral surface of the winding shaft includes the peripheral surface of a semicylinder having a radius r and a curvature 1/r and the peripheral surface of a semicylinder having a radius (r−b) and a curvature 1/(r−b), both semicylinders being combined together to form a step having a height b corresponding to the total thickness of the reflection screen and a joint member.

In the reflective screen according to any one of the above embodiments of the invention, the effect of diffusing external light from a ceiling to an observer is decreased to permit the display of an image with a high contrast, and thus the displayed image may be seen as a clear image even in a bright room illuminated with a fluorescent lamp or the like. Therefore, the reflective screen is useful as a screen for projectors such as a motion picture projector. Also, the reflective screen may be easily formed as a large reflective screen at low cost. Furthermore, a shift of white balance in the light diffusing layer is corrected by the light absorbing layer or the light reflecting layer, thereby permitting the display of an image with little shift of white balance.

When the reflective screen according to any one of the embodiments of the invention is used for a general take-up reflective screen, there occurs the problem of producing indentations in the reflective screen. However, in the take-up reflective screen according to any one of the above embodiments of the invention, the occurrence of indentations in the reflective screen is suppressed to decrease a difference in luminance due to the indentations. As a result, flatness and smoothness may be easily secured in the reflective screen, thereby preventing a decrease in quality of a projected picture.

BRIEF DESCRIPTION OF THE DRAWINGS

FIGS. 2A, 2B, and 2C are sectional views (1) each showing the configuration of a reflective screen according to an embodiment of the present invention;

DESCRIPTION OF THE PREFERRED EMBODIMENTS

The inventors have found that the contrast of an image displayed on a general reflective screen is degraded by the grayed black level due to diffusion of external light on the screen from a ceiling to an observer.

In a general reflective screen including a light reflecting layer composed of, for example, Al, and a light diffusing layer having irregularity in the surface, the two layers being bonded together with a transparent adhesive layer provided therebetween, consideration is given to a case in which image light is projected from a projector light source. First, projector light is incident on the reflective screen, transmitted through the light diffusing layer and the transparent adhesive layer, and then appropriately reflected by the light reflecting layer. In this case, when the light diffusing layer does not have a controlled angle of view (isotropic diffusion angle), the diffusion angle is the same in the horizontal direction and the vertical direction, and it may be necessary to consider the angle of view of the observer and thus widen the diffusion angles in all directions. Therefore, the diffusion angle in an obliquely upward direction of the screen (direction to the ceiling) is also widened. This means that in reflection of external light incident on the screen obliquely from above, the ratio of light emitted to the observer side in front of the screen is increased, thereby degrading the contrast.

Figure 1:
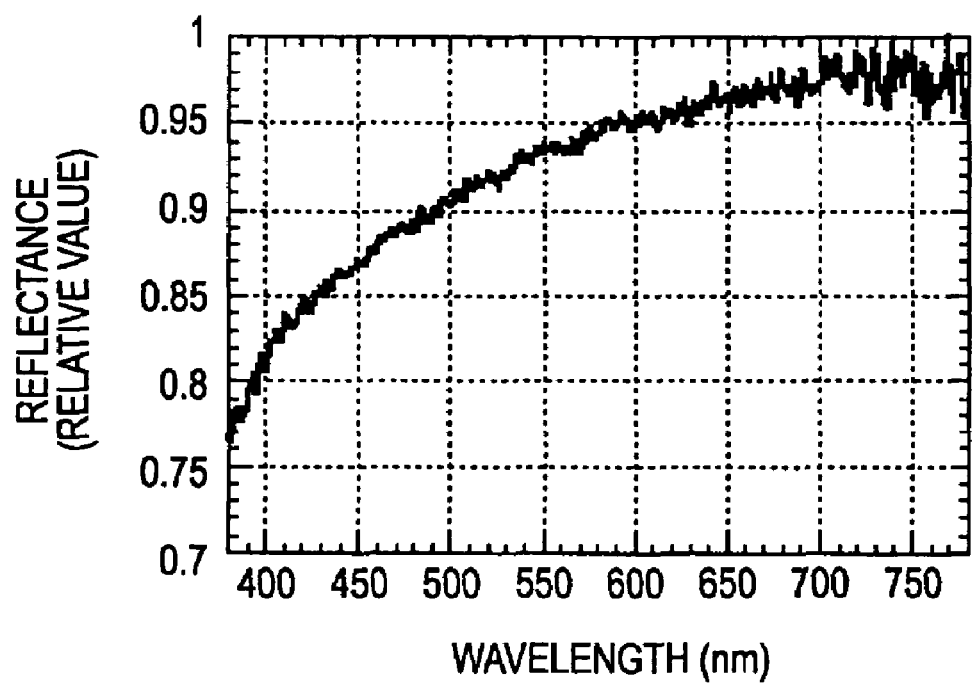
FIG. 1 is a reflection spectral atlas of a light diffusing layer.

In addition, as a result of examination of the cause of a shift of the white balance, it has been found that the shift is due to a light diffusing layer. In other words, in view of the reflection spectrum of a light diffusing layer, there is the problem that the reflection intensity tends to decrease with decreases in wavelength. An example of this problem is shown in FIG. 1. FIG. 1 shows the measurement results of a reflection spectrum of only a light diffusing layer having an uneven surface.

In consideration of the above-mentioned general reflective screen, projector light is partially reflected from the surface of the light reflecting layer on the basis of the reflection spectrum shown in FIG. 1, and thus the light emitted from the reflective screen corresponds superposed light of the light reflected from the light reflecting layer and the light reflected from the light diffusing layer. Consequently, the white balance is shifted according to the relation between reflected light components, (blue wavelength region)<(green wavelength region)<(red wavelength region).

The present invention is aimed at the resolving both problems.

A reflective screen according to a first embodiment of the present invention will be described below.

FIGS. 2A, 2B, and 2C are sectional views each showing the configuration of a reflective screen according to the first embodiment of the invention.

FIG. 2A shows a reflective screen 10A including a light reflecting layer 11 and a light diffusing layer 13 provided on the light reflecting layer 11, the light reflecting layer 11 and the light diffusing layer 13 being bonded together with a transparent adhesive layer 12.

The light reflecting layer 11 has the reflection property that the reflectance in at least the visible wavelength region is substantially uniform. The surface of the light reflecting layer 11 is preferably composed of Al, Ag, Ti, Nb, Ni, Cr, Fe, or an alloy thereof, or an alloy with a composition containing Fe, Cr, or Ni as a main component and at least one element of Mn, C, Si, P, S, Mo, Cu, and N as an additive element. The form of the light reflecting layer 11 may be a metal plate or metal foil composed of Al, Ag, Ti, Nb, Ni, Cr, or an alloy thereof, or a plastic film used as a substrate and coated with any one of these metals.

The light diffusing layer 13 is, for example, a flexible diffusion plate composed of a light transmitting resin and having micro irregularity randomly formed in the surface. More specifically, the surface of the light diffusing layer 13 has an irregular form in which micro surface elements each including a portion of a substantially ellipsoidal body (for example, a convex portion formed by dividing an ellipsoid into two parts along a section with the longest diameter) are assembled to have random sizes and/or a random arrangement. The micro surface elements preferably have outer sizes with long diameter/short diameter ratios (aspect ratio) which are as constant as possible.

The light diffusing layer 13 diffuses light reflected by the light reflecting layer 11. The light diffusing layer has the diffusion property that in one (A axis) of two perpendicular axial directions on a light diffusion plane, a luminance distribution curve versus incidence angle is asymmetric with respect to the zero-incidence-angle axis, and a side with a small incidence angle on the A axis (half-luminance incidence angle) at which the luminance is half of a peak luminance in the normal direction to the screen plane faces in a direction in which external light has the highest strength. In other words, the light diffusing layer 13 has the diffusion property that in one (A axis) of two perpendicular axial directions on the light diffusion plane, an incidence angle (half-luminance incidence angle) at which luminance is half of a peak luminance in the normal direction to the screen plane is different on the positive-incidence-angle side and the negative-incidence-angle side of the zero-incidence-angle axis on the A axis, and the side with a smaller half-luminance incidence angle on the A axis faces in a direction in which external light has the highest strength.

On the side of the light diffusing layer 13 which has a smaller half-luminance incidence angle on the A axis, the light diffusing layer 13 has the diffusion property that the luminance in the normal direction to the screen plane is preferably 1/10 or less of the peak luminance at an incidence angle of the sum of the half-luminance incidence angle and an angle of 0 to 20 degrees.

Furthermore, on the side of the light diffusing layer 13 which has a larger half-luminance incidence angle on the A axis and in the other axial direction of the two perpendicular axis directions on the light diffusion plane, the light diffusing layer 13 has the diffusion property that the luminance in the normal direction to the screen plane is preferably ¹⁄₁₀ or less of the peak luminance at an incidence angle of the sum of the half-luminance incidence angle and an angle of 0 to 20 degrees.

Figure 3:
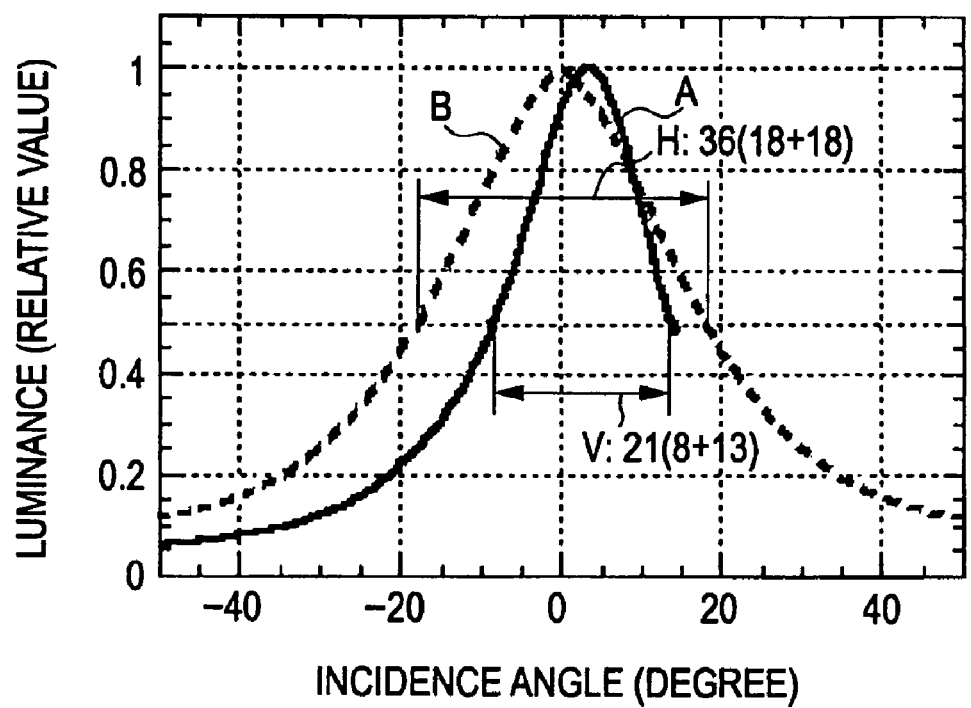
FIG. 3 is a graph (1) showing the diffusion properties of a light diffusing layer used in the invention.

FIG. 3 shows an example of the diffusion properties of the light diffusing layer 13.

In the reflective screen 10A according to the first embodiment of the invention, white light was applied in two perpendicular directions (A-axis direction and B-axis direction) of the light diffusion plane of the light diffusing layer 13 with changing incidence angles. FIG. 3 shows the results (incidence angle-luminance relation) of measurement of luminance in the normal direction (direction of zero incidence angle) to the screen plane. When light applied to the light diffusing layer 13 at an incidence angle of 0° is diffused from the light diffusion plane, measurement of the angle dependency of luminance of diffused light shows the same results (but for a scattering angle-luminance relation).

With respect to the diffusion properties in the B-axis direction (curve B in FIG. 3), the curve is symmetric with respect to the zero-incidence-angle axis, and the incidence angle (half-luminance incidence angle) at which the luminance in the normal direction to the screen plane is half of the peak luminance is the same (18°) on both sides on the B axis.

On the other hand, with respect to the diffusion properties in the A-axis direction (curve A in FIG. 3), the curve is asymmetric with respect to the zero-incidence-angle axis, and the half-luminance incidence angle is different on the positive-incidence-angle side and the negative-incidence-angle side of the zero-incidence-angle axis on the A axis. In FIG. 3, the half-luminance incidence angle on the side with a positive incidence angle (right side in the figure) is 13°, and the half-luminance incidence angle on the side with a negative incidence angle (left side in the figure) is 80°.

In the screen according to the first embodiment of the invention, the light diffusing layer 13 is disposed so that the side with a smaller half-luminance incidence angle in the A-axis direction (the side with 8° in FIG. 3) faces in a direction in which external light has the highest strength.

In this case, the light diffusing layer 13 is preferably disposed so that the A-axis direction coincides with the screen vertical direction (longitudinal direction), and the side with a smaller half-luminance incidence angle is located in an upper portion of the screen in the vertical direction. As a result, external light scattering to the observer is decreased.

In order that the half-luminance incidence angle is different on the positive-incidence-angle side the negative-incidence-angle side of the zero-incidence-angle axis on an axis of the light diffusion plane, the light diffusing layer 13 preferably has the diffusion property that the maximum luminance (peak luminance) of the curve of the incidence angle-luminance relation (or scattering angle-luminance relation) is axially shifted (curve A in FIG. 3). For example, in FIG. 3, the peak luminance of curve A is axially shifted to the positive-incidence-angle side (the side with a large half-luminance angle on the A axis). The amount of axial shift is preferably larger than 0° and more preferably 4° or more in terms of incidence angle.

In order that the half-luminance incidence angle is different on the positive-incidence-angle side and the negative-incidence-angle side of the zero-incidence-angle axis on an axis of the light diffusion plane, another method may be used, in which a luminance distribution is made asymmetric with respect to the maximum-luminance axis of the curve.

The light diffusing layer 13 preferably has the light diffusion plane having the property that emitted light falls in a desired range, i.e., the property (isotropy) that the diffusion angle in the screen horizontal direction (transverse direction) is different from that in the screen vertical direction (longitudinal direction). In FIG. 3, the diffusion angle in the A-axis direction (screen vertical direction) is 21°, and the diffusion angle in the B-axis direction (screen horizontal direction) is 36°. Consequently, light emitted from the screen is controlled to direct within a desired field of view, thereby imparting good visibility to the screen.

The above-described properties of the light diffusing layer 13 are achieved by the light diffusion plane having micro surface elements of a convex or concave shape which is asymmetric with respect to the normal line to the screen plane, i.e., a main surface of the light diffusing layer 13. Specifically, when each of the micro surface elements includes a convex portion formed by, for example, dividing an ellipsoid, the height direction of the convex portion coincides with the Z axis, and the long diameter direction and the short diameter direction at the bottom of the convex portion coincide with the X axis and the Y axis, respectively, so that the apex of the convex portion in the Z-axis direction is shifted in the X-axis direction, the Y-axis direction, or both the X- and Y-axis directions with respect to the center of the bottom of the convex portion. Such a light diffusion plane is obtained by transferring the irregular shape of a mold surface which is formed by sand blasting at an abrasive spray angle of less than 90° with the mold over the entire surface. In this case, the surface of the light diffusing layer 13 preferably has an irregularity pitch of 1 mm or less.

In the sand blasting, an abrasive material is ejected from a blast gun of a sand blasting apparatus and sprayed on the surface of a mold base so that the abrasive material is caused to collide with the surface of the mold base to form irregularity in the surface of the mold base.

The abrasive material preferably includes spherical or angular, for example, polygonal, particles composed of a resin, glass, a metal, or ceramic, and more preferably angular particles. For example, glass beads, zioconia particles, steel grits, alumina particles, silica particles, or the like may be used.

Furthermore, the abrasive material preferably has an average particle size of 1 to 1000 μm, more preferably 5 to 600 μm, and most preferably 5 to 50 μm.

The abrasive material preferably has a weight of 0.002 to 8 mg per particle.

The mold base includes a sheet composed of a material suitable for sand blasting. The material is preferably a resin or a metal such as aluminum, copper, or stainless steel, particularly aluminum.

The abrasive material is preferably sprayed under a condition in which the spray angle (depression angle) of the abrasive material with the main surface of the mold base is less than 90° over the entire surface. In detail, the injection angle (blasting angle) of the abrasive material from the blast gun with respect to the main surface of the mold base is preferably set in a range of 0° to less than 90° and more preferably 10° to 22°. It may be possible that the irregular shape of the surface of the light diffusing layer 13 is controlled by the angle, and consequently the desired diffusion properties of the light diffusing layer 13 according to the embodiment of the invention are obtained.

The abrasive material colliding with the mold base cuts or deforms the surface of the mold base while losing its energy and then scatters at an angle upward from the mold base. However, under the above-described spray condition, the abrasive material collides with the mold base at a certain angle, and thus the deformed shape produced by the collision in the transverse direction is different from that in the longitudinal direction.

With respect to the processed shape of the mold base, the processed shape in the spray direction of the abrasive material may be controlled by the pressure of pressurized air of the blast gun, which controls spray energy, the angle of the blast gun, the distance between the blast bun and the mold base, the shape, density, and hardness of the abrasive material, the material quality of the mold base, and the like. The processed shape in the direction vertical to the spray direction may be controlled by the shape and hardness of the abrasive material. Since the locus of deformation of the mold base accompanied with the energy lost of the abrasive material is asymmetric with the locus of scattering from the mold base due to repulsive force, an asymmetric shape with respect to the main surface axis of the mold base may be formed.

By using the mold for duplicating the light diffusing layer, which is produced under the above-descried spray conditions, the light diffusing layer is formed to have different diffusion angles in the longitudinal direction and the transverse direction or anisotropic diffusion properties in the longitudinal and transverse directions. For example, the diffusion angle of reflected light or transmitted light is narrow in the screen vertical direction but wide in the screen horizontal direction, thereby causing the diffusion property that the luminance peak is shifted to one of the sides in the screen vertical direction.

Alternatively, the diffusion angle of reflected light or transmitted light becomes narrow in the screen vertical direction but wide in the screen horizontal direction, and the maximum luminance axis in the incidence angle-luminance relation (or the scattering angle-luminance relation) is inclined downward from the normal direction to the main surface of the light diffusing layer (screen). Therefore, the luminance distribution becomes asymmetric with respect to the maximum luminance axis.

Use of the reflective screen 10A according to the first embodiment of the invention has the following effects:

Since external light incident on the screen mainly reaches the screen obliquely from above (from the ceiling), the side with a small half-luminance incidence angle on the A axis of the light diffusing layer 13 is preferably disposed in an upper portion of the screen in the vertical direction. In this case, the effect of diffusing external light to the observer is decreased, and, consequently, an image with a high contrast is displayed. Therefore, even in a bright room illuminated with a fluorescent lamp, the displayed image is seen as a clear image.

Variations of the reflective screen according to the first embodiment of the invention will be described below.

FIG. 2B is a sectional view showing the configuration of a variation (1) of the reflective screen according to the first embodiment of the invention.

A reflective screen 10B has a structure in which a light reflecting layer 11, a light absorbing layer 22, and a light diffusing layer 13 are laminated in order.

In this structure, the light reflecting layer 11 and the light diffusing layer 13 are the same as described above with reference to FIG. 2A.

The light absorbing layer 22 absorbs part of transmitted light and has the light absorption property that the quantity of absorbed light decreases toward the shorter wavelength side in the visible light region so that the amounts of reflection of red light, green light, and blue light in the screen are the same. In other words, the light absorption property is represented by the following relation:

(absorptance of blue wavelength region)<(absorptance of green wavelength region)<(absorptance of red wavelength region)

The blue wavelength region, green wavelength region, and red wavelength region preferably correspond to the primary color wavelength regions of a projector light source. For example, the blue wavelength region, green wavelength region, and red wavelength region range from 450 nm to less than 500 nm, 500 nm to less than 600 nm, and 600 nm to less than 650 nm, respectively.

The correlations between the absorptances (average absorptance) of the respective wavelength regions are preferably as follows:

(absorptance of red wavelength region)−(absorptance of green wavelength region)$\leqq$3%

(absorptance of green wavelength region)−(absorptance of blue wavelength region)$\leqq$3.5%

The light absorbing layer 22 includes a transparent resin layer composed of, for example, an acrylic resin, in which a single colorant having predetermined light absorption properties, such as a pigment or a dye, or a blend of several colorants is dispersed. The resin layer may contain carbon black. The light absorption properties of the light absorbing layer 22 may be controlled by selecting the type and adding amount of the colorant according to the reflection properties of the light diffusing layer 13 which will be described below.

The light absorbing layer 22 is preferably composed of an adhesive containing a pigment. In this case, the light absorbing layer 22 is also used as an adhesive layer for bonding together the light reflecting layer 11 and the light diffusing layer 13.

Use of the reflective screen 10B according to the first embodiment of the invention has the following effects:

Since external light incident on the screen mainly reaches the screen obliquely from above (from the ceiling), the side with a small half-luminance incidence angle on the A axis of the light diffusing layer 13 is preferably disposed in an upper portion of the screen in the vertical direction. In this case, the effect of diffusing external light to the observer is decreased, and, consequently, an image with a high contrast is displayed. Therefore, even in a bright room illuminated with a fluorescent lamp, the displayed image is seen as a clear image. In addition, image light projected from a projector light source is first incident on the reflective screen 10B, transmitted through the light diffusing layer 13, and then enters the light absorbing layer 22 in which incident light is partially absorbed according to the absorption property of the light absorbing layer 22 ((absorptance of blue wavelength region) <(absorptance of green wavelength region)<(absorptance of red wavelength region)). The remainder is transmitted and property reflected by the light reflecting layer 11. Furthermore, the reflected light again enters the light absorbing layer 22 in which the reflected light is partially absorbed according to the light absorption property. The remainder is transmitted and then scattered and emitted by the light diffusing layer 13 (reflected light A). At the same time, the projector light is partially reflected by the surface of the light diffusing layer 13 on the basis of the reflection spectrum shown in FIG. 1 (reflected light B). As a result, emitted light of the reflective screen 10B corresponds to superposed light of reflected light A and reflected light B, and thus the chromaticity balance of reflected light A is controlled to finally produce an image with a good white balance.

Furthermore, the projector light is substantially vertically incident on the reflective screen 10B, and external light is incident at a certain angle on the reflective screen 10B. Therefore, in the reflective screen 10B according to the first embodiment of the invention, the optical path of the projector light through the light absorbing layer 22 is shorter than the optical path of external light through the light absorbing layer 22, thereby causing selectivity between external light and projector light and improving the contrast ratio of a display image in comparison to general images.

FIG. 2C is a sectional view showing the configuration of a variation (2) of the reflective screen according to the first embodiment of the invention.

A reflective screen 10C has a structure in which a light reflecting layer 21, an adhesive layer 12, and a light diffusing layer 13 are laminated in order.

In this structure, the adhesive layer 12 and the light diffusing layer 13 are the same as described above with reference to FIG. 2A.

The light reflecting layer 21 includes an optical laminated film containing a metal film and a metal oxide thin film and has the light reflection property that the reflectance increases toward the shorter wavelength side in the visible light region so that the amounts of reflection of red light, green light, and blue light from a projector light source are the same in the screen. In other words, the light reflection property is represented by the relation:

(reflectance of blue wavelength region)>(reflectance of green wavelength region)>(reflectance of red wavelength region)

The blue wavelength region, green wavelength region, and red wavelength region preferably correspond to the primary color wavelength regions of the projector light source. For example, the blue wavelength region, green wavelength region, and red wavelength region range from 450 nm to less than 500 nm, 500 nm to less than 600 nm, and 600 nm to less than 650 nm, respectively.

The metal film constituting the light reflecting layer 21 has the reflection property that reflectance is substantially uniform at least in the visible light region. The metal film is preferably composed of Al, Ag, Ti, Nb, Ni, Cr, Fe, or an alloy thereof, or may be composed of an alloy having a composition containing Fe, Cr, or Ni as a main component and at least one element of Mn, C, Si, P, S, Mo, Cu, and N as an additive element.

The metal oxide thin film is preferably a dielectric film composed of $Nb_2O_5$, $TiO_2$, $Ta_2O_5$, $Al_2O_3$, or $SiO_2$, or a conductive film composed of $In_2O_3$, $SnO_2$, ZnO, an $In_2O_3$—$SnO_2$ compound, or a material doped with any one of these metals. The light reflection property may be controlled by the thickness of the metal oxide thin film.

Use of the reflective screen 10C according to the first embodiment of the invention has the following effects:

Since external light incident on the screen mainly reaches the screen obliquely from above (from the ceiling), the side with a small half-luminance incidence angle on the A axis of the light diffusing layer 13 is preferably disposed in an upper portion of the screen in the vertical direction. In this case, the effect of diffusing external light to the observer is decreased, and, consequently, an image with a high contrast is displayed. Therefore, even in a bright room illuminated with a fluorescent lamp, the displayed image is seen as a clear image. In addition, image light projected from a projector light source is first incident on the reflective screen 10C, transmitted through the light diffusing layer 13 and the adhesive layer 12, and then enters the light reflecting layer 21 in which incident light is partially reflected according to the reflection property of the light reflecting layer 21 ((reflectance of blue wavelength region)>(reflectance of green wavelength region)>(reflectance of red wavelength region)). The reflected light is further transmitted through the adhesive layer 12 and then scattered and emitted by the light diffusing layer 13 (reflected light C). At the same time, the projector light is partially reflected by the surface of the light diffusing layer 13 on the basis of the reflection spectrum shown in FIG. 1 (reflected light B). As a result, emitted light of the reflective screen 10C corresponds to superposed light of reflected light C and reflected light B, and thus the chromaticity balance of reflected light C is controlled to finally produce an image with a good white balance.

A reflective screen according to a second embodiment of the invention will be described.

Figure 4D:
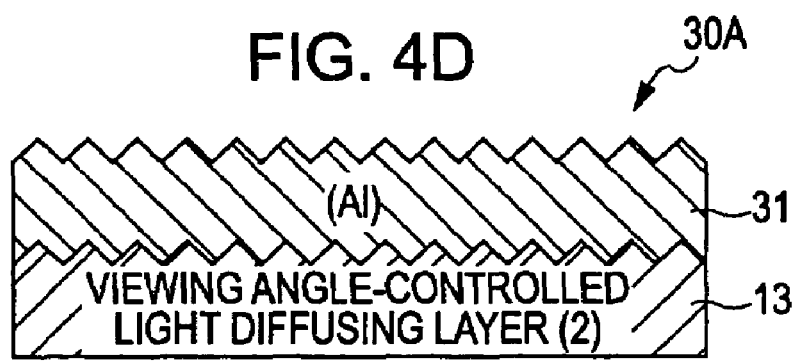
FIGS. 4D, 4E, and 4F are sectional views (2) each showing the configuration of a reflective screen according to an embodiment of the present invention.
Figure 4E:
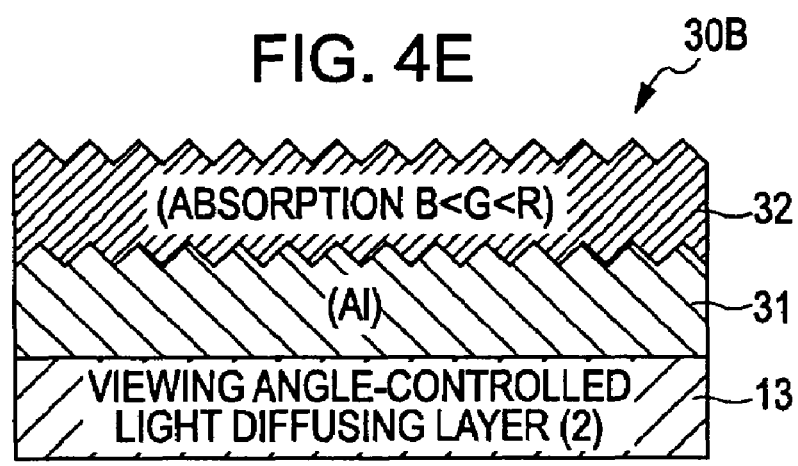
Figure 4F:
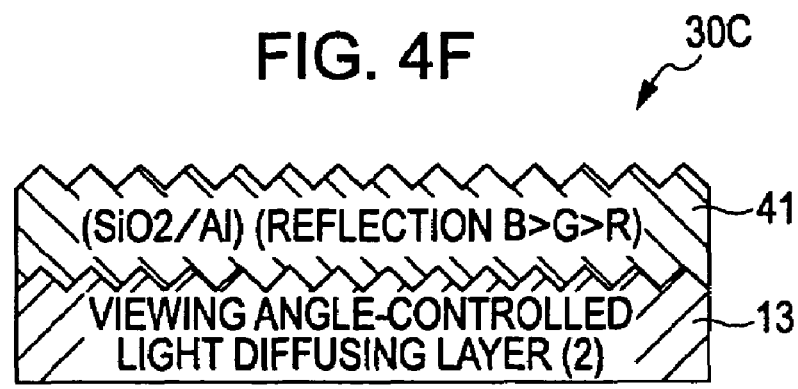

FIGS. 4D, 4E, and 4F are sectional views each showing the configuration of the reflective screen according to the second embodiment of the invention.

FIG. 4D shows a reflective screen 30A including a light diffusing layer 13 and a light reflecting layer 31 provided on the light diffusing layer 13.

The light diffusing layer 13 is the same as described in the first embodiment with reference to FIG. 2A.

In the second embodiment, the light diffusing layer 13 is disposed so that the side with a small half-incidence angle in the A-axis direction (the side with 8° in FIG. 3) faces in a direction in which external light has the highest strength. In this case, the light diffusing layer 13 is preferably disposed so that the A-axis direction coincides with the screen vertical direction (longitudinal direction), and the side with a small half-luminance angle is located in an upper portion of the screen in the vertical direction.

The light reflecting layer 31 is composed of a metal film having the reflection property that reflectance is substantially uniform at least in the visible light region. For example, the light reflecting layer 31 is composed of Al, Ag, Ti, Nb, Ni, Cr, or an alloy thereof, and the irregular surface of the light diffusing layer 13 is directly reflected in the surface of the light reflecting layer 31. The light reflecting layer 31 may be formed by sputtering the above-descried metal, and a transparent protective film composed of an organic resin may be provided on the uppermost layer of the light reflecting layer 31.

In the reflective screen 30A, reflected light is scattered by the irregular surface of the light reflecting layer 31. The irregular shape is substantially the same as in the light diffusing layer 13, and the diffusion properties are the same as those of the light diffusing layer 13 in the first embodiment.

Use of the reflective screen 30A according to the second embodiment of the invention has the following effects:

Since external light incident on the screen mainly reaches the screen obliquely from above (from the ceiling), the side with a small half-luminance incidence angle on the A axis of the light diffusing layer 13 is preferably disposed in an upper portion of the screen in the vertical direction. In this case, the effect of diffusing external light to the observer on the surface of the light reflecting layer 31 is decreased, and, consequently, an image with a high contrast is displayed. Therefore, even in a bright room illuminated with a fluorescent lamp, the displayed image is seen as a clear image.

Variations of the reflective screen according to the second embodiment of the invention will be described.

FIG. 4E is a sectional view showing the configuration of a variation (1) of the reflective screen according to the second embodiment of the invention.

A reflective screen 30B has a structure in which a light diffusing layer 13, a light reflecting layer 31, and a light absorbing layer 32 are laminated in order. Namely, the light absorbing layer 32 is provided on the light reflective layer 31 in the reflective screen 30A.

In this structure, the light diffusing layer 13 and the light reflecting layer 31 are the same as descried above with reference to FIG. 4D.

The light absorbing layer 32 partially absorbs transmitted light and has the light absorption property that the quantity of absorbed light decreases toward the shorter wavelength side in the visible light region so that the amounts of reflection of red light, green light, and blue light of the projector light are the same in the screen. In other words, the light absorption property is represented by the following relation:

(absorptance of blue wavelength region)<(absorptance of green wavelength region)<(absorptance of red wavelength region)

The blue wavelength region, green wavelength region, and red wavelength region preferably correspond to the primary color wavelength regions of the projector light source. For example, the blue wavelength region, green wavelength region, and red wavelength region range from 450 nm to less than 500 nm, 500 nm to less than 600 nm, and 600 nm to less than 650 nm, respectively.

The correlations between the absorptances (average absorptance) of the respective wavelength regions are preferably as follows:

(absorptance of red wavelength region)−(absorptance of green wavelength region)≦3%

(absorptance of green wavelength region)−(absorptance of blue wavelength region)≦3.5%

The light absorbing layer 32 includes a transparent resin layer composed of, for example, an acrylic resin, in which a single colorant having predetermined light absorption properties, such as a pigment or a dye, or a blend of several colorants is dispersed. The resin layer may contain carbon black. The light absorption properties of the light absorbing layer 32 may be controlled by selecting the type and adding amount of the colorant according to the reflection properties of a laminate of the light diffusing layer 13 and the light reflecting layer 31 (corresponding to the reflective screen 30A).

The irregular surface shape of the light reflecting layer 31 is directly reflected in the light absorbing layer 33, and the diffusion properties of the reflective screen 30B are the same as the diffusion properties of the light diffusing layer 13 according to the first embodiment.

Use of the reflective screen 30B according to the second embodiment of the invention has the following effects:

Since external light incident on the screen mainly reaches the screen obliquely from above (from the ceiling), the side with a small half-luminance incidence angle on the A axis of the light diffusing layer 13 is preferably disposed in an upper portion of the screen in the vertical direction. In this case, the effect of diffusing external light to the observer is decreased, and, consequently, an image with a high contrast is displayed. Therefore, even in a bright room illuminated with a fluorescent lamp, the displayed image is seen as a clear image. In addition, image light projected from a projector light source first enters the light absorbing layer 32 of the reflective screen 30B in which incident light is partially absorbed according to the absorption property of the light absorbing layer 32 ((absorptance of blue wavelength region)<(absorptance of green wavelength region)<(absorptance of red wavelength region)). The remainder is transmitted and then appropriately reflected by the light reflecting layer 31. Then, the reflected light again enters the light absorbing layer 32 in which the reflected light is partially absorbed according to the absorption property. The remainder is transmitted and then scattered and emitted (reflected light D). At the same time, the light is partially reflected by the surface of the light absorbing layer 32 on the basis of the reflection spectrum shown in FIG. 1 (reflected light E). As a result, emitted light of the reflective screen 30B corresponds to superposed light of reflected light D and reflected light E, and thus the chromaticity balance of reflected light D is controlled to finally produce an image with a good white balance.

Furthermore, the projector light is substantially vertically incident on the reflective screen 30B, and external light is incident at a certain angle on the reflective screen 30B. Therefore, in the reflective screen 30B according to the second embodiment of the invention, the optical path of the projector light through the light absorbing layer 32 is shorter than the optical path of external light through the light absorbing layer 32, thereby causing selectivity between external light and projector light and improving the contrast ratio of a display image in comparison to general images.

FIG. 4F is a sectional view showing the configuration of a variation (2) of the reflective screen according to the second embodiment of the invention.

A reflective screen 30C has a structure in which a light diffusing layer 13 and a light reflecting layer 41 are laminated in order.

The light diffusing layer 13 is the same as described above with reference to FIG. 2A.

The light reflecting layer 41 is composed of an optical laminated film containing a metal film and a metal oxide thin film and has the light reflection property that the reflectance increases toward the shorter wavelength side in the visible light region so that the amounts of reflection of red light, green light, and blue light from a projector light source are the same in the screen. In other words, the light reflection property is represented by the relation:

(reflectance of blue wavelength region)>(reflectance of green wavelength region)>(reflectance of red wavelength region)

The blue wavelength region, green wavelength region, and red wavelength region preferably correspond to the primary color wavelength regions of the projector light source. For example, the blue wavelength region, green wavelength region, and red wavelength region range from 450 nm to less than 500 nm, 500 nm to less than 600 nm, and 600 nm to less than 650 nm, respectively.

The metal film constituting the light reflecting layer 41 has the reflection property that reflectance is substantially uniform at least in the visible light region. The metal film is preferably composed of Al, Ag, Ti, Nb, Ni, Cr, or an alloy thereof.

The metal oxide thin film is preferably a dielectric film composed of $Nb_2O_5$, $TiO_2$, $Ta_2O_5$, $Al_2O_3$, or $SiO_2$, or a conductive film composed of $In_2O_3$, $SnO_2$, ZnO, an $In_2O_3$—$SnO_2$ compound, or a material doped with any one of these metals. The light reflection property may be controlled by the thickness of the metal oxide thin film.

The irregular surface of the light diffusing layer 13 is directly reflected in the light reflecting layer 41. The metal film and metal oxide thin film of the light reflecting layer 41 may be formed by sputtering the above-described metal.

In the reflective screen 30C, reflected light is scattered by the surface irregularity of the light reflecting layer 41. The irregular shape is substantially the same as the light diffusing layer 13, and the diffusion properties are the same as those of the light diffusing layer 13 in the first embodiment.

Use of the reflective screen 30C according to the second embodiment of the invention has the following effects:

Since external light incident on the screen mainly reaches the screen obliquely from above (from the ceiling), the side with a small half-luminance incidence angle on the A axis of the light diffusing layer 13 is preferably disposed in an upper portion of the screen in the vertical direction. In this case, the effect of diffusing external light to the observer is decreased, and, consequently, an image with a high contrast is displayed. Therefore, even in a bright room illuminated with a fluorescent lamp, the displayed image is seen as a clear image. In addition, image light projected from the projector light source is first incident on the light reflecting layer 41 of the reflective screen 30C in which incident light is partially reflected according to the reflection property of the light reflecting layer 41 ((reflectance of blue wavelength region)>(reflectance of green wavelength region)>(reflectance of red wavelength region)), and scattered and emitted (reflected light F). At the same time, the projector light is partially reflected by the surface of the light reflecting layer 41 on the basis of the reflection spectrum shown in FIG. 1 (reflected light G). As a result, emitted light of the reflective screen 30C corresponds to superposed light of reflected light F and reflected light G, and thus the chromaticity balance of reflected light F is controlled to finally produce an image with a good white balance.

(Take-up Reflective Screen)

Figure 5:
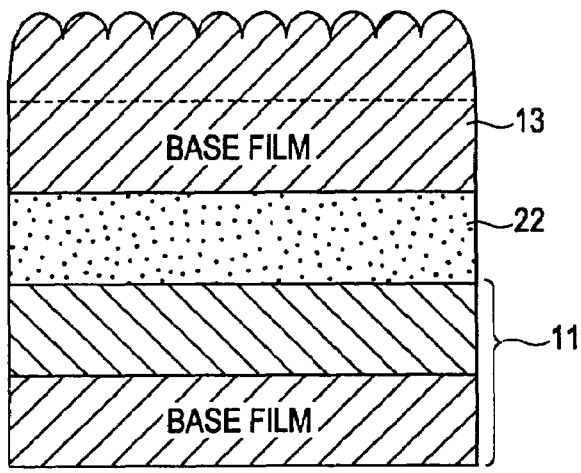
FIG. 5 is a sectional view (1) showing the detailed configuration of a reflective screen according to an embodiment of the invention.

The configurations of the above-described reflective screens, for example, the configuration of the variation (1) of the first embodiment, are as shown in FIG. 5, in which the light diffusing layer 13 has a thickness of about 100 μm, the light absorbing layer 22 has a thickness of about 38 μm, and the light reflecting layer 11 (including a base film and an Al metal film formed thereon by sputtering) has a thickness of about 188 μm. This configuration has the problem that when the reflective screen is taken up as a roll take-up screen with a specified curvature, flatness is not maintained because of take-up curl, thereby degrading image quality. This phenomenon is possibly due to the fact that each of the films constituting the screen is thick, and a crystalline transparent film is laminated. In this configuration, when a metal film is formed by sputtering on a base film (for example, PET film of 100 μm or less) which is thinned for thinning the light reflecting layer 11, there occurs the problem of heat damage or blocking due to damage by radiant heat and plasma during the process. In use of a PET film as the base film of the light reflecting layer 11, the thickness is preferably 100 μm or more in view of the damage to the base film during sputtering.

However, even in a screen including a light reflecting layer 11 having a base film of 100 μm in thickness (PRT film) and a metal film, a light diffusing layer 13 of 50 μm in thickness (PFT film+acrylic urethane resin), and a light absorbing layer 22 of 38 μm in thickness (acrylic resin), take-up curl occurs when the screen is again unwound after winding into a roll.

Conceivable methods for preventing take-up curl include a method of increasing the diameter of a roll and a method of forcibly correcting winding warp by pulling a screen film with some degree of tension using a weight suspended therefrom. In the former method among the two methods, when the roll diameter is excessively increased, the appearance of the screen is impaired, and the area occupied by the roll is enlarged. Therefore, the method of increasing the roll diameter for avoiding take-up curl is undesirable. In the latter method, when the weight is excessively increased, creep elongation occurs, or excessive take-up curl occurs to cause cupping in a rigid film even with the tension applied thereto. Therefore, the latter method is also undesirable.

As described above, a roll take-up reflective screen is desired to include constituent materials having low rigidity and a small total thickness.

As a result of intensive research for resolving this problem, the inventors have developed a roll take-up reflective screen having a smaller total thickness and causing little take-up curl, and a method producing the same. The configuration will be described below.

The present invention is aimed at decreasing the thickness of the reflective screen according to the first embodiment among flexible reflective (front projection type) screens for front projectors having high contrast under external light. In other words, the light reflecting layer 11 shown in FIG. 5 is designed so as to omit the base film or decrease the thickness to 100 μm or less.

(Basic Configuration 1)

Figure 6:
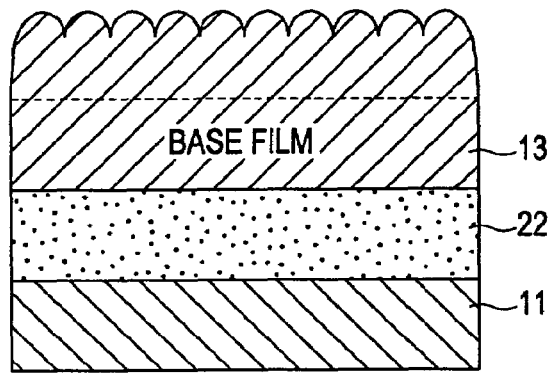
FIG. 6 is a sectional view (2) showing a detailed configuration of a reflective screen according to an embodiment of the invention.

FIG. 6 shows a basic configuration 1 according to an embodiment of the invention. In this configuration, the light reflecting layer 11 including a metal film alone is transferred onto the light diffusing layer 13 through the light absorbing layer 22. In this case, a base film may be omitted from the light reflecting layer 11.

A method for manufacturing a reflective screen having the basic configuration 1 will be described below.

Figure 7:
FIG. 7 is a sectional view (1) showing a configuration of a peel film.

In order to form the light reflecting layer 11 in the reflective screen, a peel film (light reflecting layer/base film) including a base film 11b and the light reflecting layer 11 (metal film) formed thereon is prepared, as shown in FIG. 7.

The base film is preferably flexible and mainly composed of polyethylene terephthalate (PET), polycarbonate (PC), polyether sulfone (PES), polyphenylene sulfide (PPS), polyimide (PI), polyvinyl chloride (PVC), polyether imide (PEI), polyethylene naphthalate (PEN), aramid, polyolefin (PO), polyacrylate (PAR), triacetyl cellulose (TAC), polyether ether ketone (PEEK), norbornen resin, olefin, styrene, polyester, polyphenylene oxide (PPO), epoxy, urethane, or polyamide.

The metal film is formed by a physical vaporization method such as vapor deposition, sputtering, or the like. In an experiment, an Al metal film was formed by a roll-to-roll sputtering method capable of forming a film with a uniform thickness over a large area and with high reproducibility.

Figure 8:
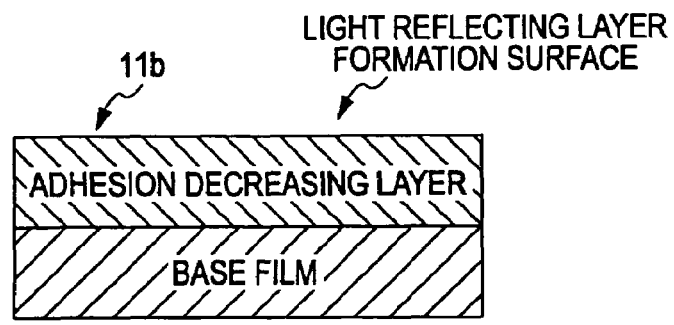
FIG. 8 is a sectional view (1) showing a configuration of a base film.

In the basic configuration 1, the base film 11b is peeled from the light reflecting layer 11 shown in FIG. 7. Therefore, the adhesive strength between the light reflecting layer 11 and the base film 11b is preferably lower than that between the light diffusing layer 13 and the light absorbing layer 22. Thus, the base film 11b is preferably formed using a material such as aramid, PVC, or any one of the above-described resins containing silicon or fluorine. A film formed by coating the base film with silicon or fluorine is also preferred because adhesive strength is decreased. FIG. 8 shows an example of the configuration.

In view of heat damage due to plasma heat in forming the light reflecting layer 11 on the base film 11b, the base film 11b preferably has a certain thickness, and, for example, a PET film preferably has a thickness of 50 μm or more. If the thickness is smaller than this value, heat damage may occur.

Figure 9:
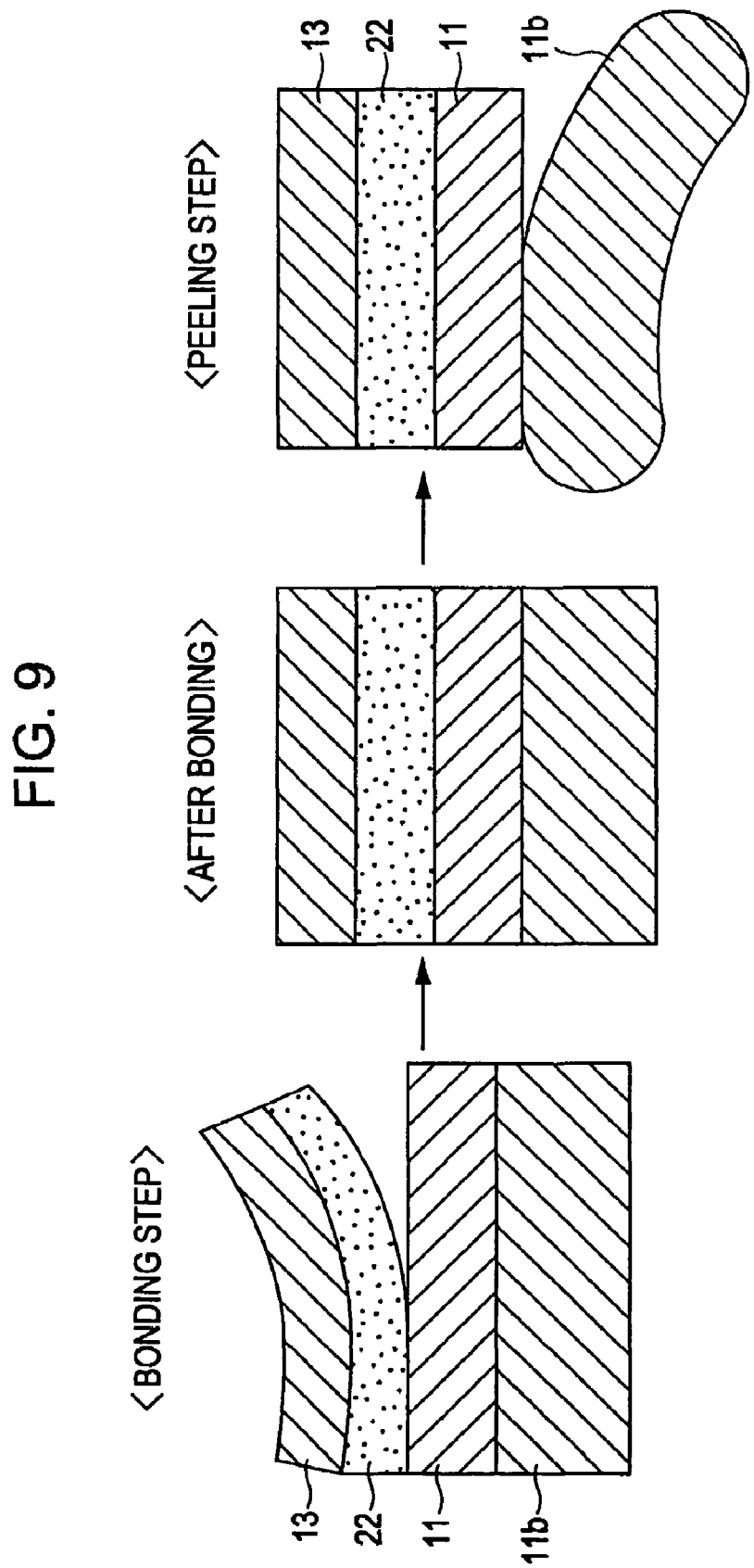
FIG. 9 is a view showing steps for manufacturing a take-up reflective screen.

After the peel film shown in FIG. 7 is formed, the peel film is bonded to the light diffusing layer 13 through the light absorbing layer 22 having adhesiveness so that the light reflecting layer 11 faces the light diffusing layer 13. Then, the base film 11b is peeled from the laminate of the light diffusing layer 13, the light absorbing layer 22, and the light reflecting layer 11. These procedures are shown in FIG. 9.

Since the adhesive strength between the base film 11b and the light reflecting layer 11 is smaller that between the light reflecting layer 11 and the light absorbing layer 22, the light reflecting layer 11 is separated from the base film 11b by peeling the base film 11b and follows the light diffusing layer side. Therefore, only the base film 11b is separated, and thus the reflective screen is thinned by an amount corresponding to the thickness of the base film 11b.

(Experiment of Basic Configuration 1)

An Al metal film (light reflecting layer 11) was formed on a PVC film of 200 μm in thickness (base film 11b) by roll-to-roll sputtering, and then the light diffusing layer 13 is bonded to the metal film through the light absorbing layer 22 having adhesiveness. Then, the PVC film was peeled from the laminate of the light reflecting layer 11, the light absorbing layer 22, and the light diffusing layer 13. As a result, it was confirmed that a reflective screen is produced without damage to each of the layers.

(Basic Configuration 2)

Figure 10:
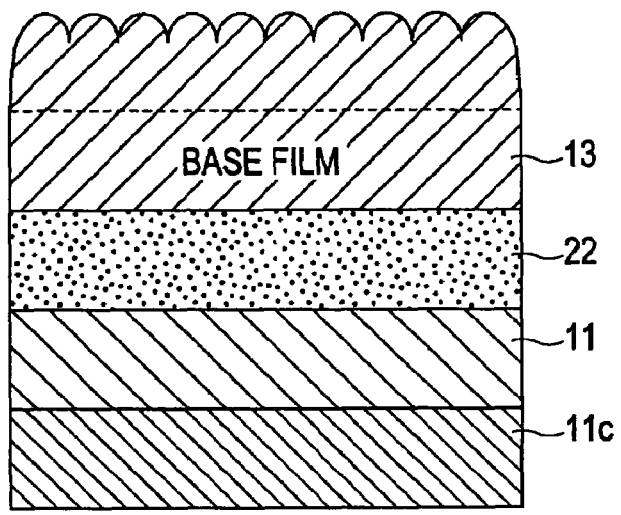
FIG. 10 is a sectional view (3) showing a detailed configuration of a reflective screen according to an embodiment of the invention.

FIG. 10 shows a basic configuration 2 according to an embodiment of the invention. In this configuration, a light reflecting layer 11 including a metal film alone and a peel layer 11c are transferred onto a light diffusing layer 13 through a light absorbing layer 22.

In the basic configuration 1, the metal film serving as the light reflecting layer 11 is exposed, and thus mechanical reliability and environmental resistance may be decreased. Also, it may be difficult to uniformly form the metal film on the peeled surface of the base film 11b.

The basic configuration 2 includes the same laminate of the light diffusing layer 13, the light absorbing layer 22, and the light reflecting layer 11 as in the basic configuration 1, but is different in that the peel layer 11c serving as a protective film is provided on the light diffusing layer 11, in order to resolve the problem of the basic configuration 1.

A reflective screen having the basic configuration 2 is basically produced by the same method as for the basic configuration 1, but is different in the configuration of a peel film to be bonded to the light diffusing layer 13 and the light absorbing layer 22. The basic configuration 2 is shown in Figs. 11A and 11B.

Figure 11A:
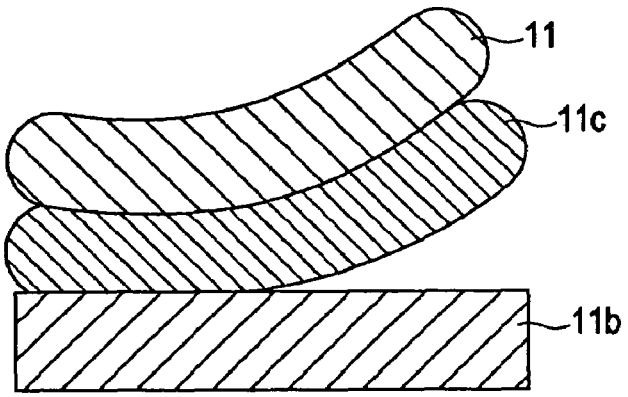
FIGS. 11A and 11B are sectional views (2) each showing a configuration of a peel film.
Figure 11B:
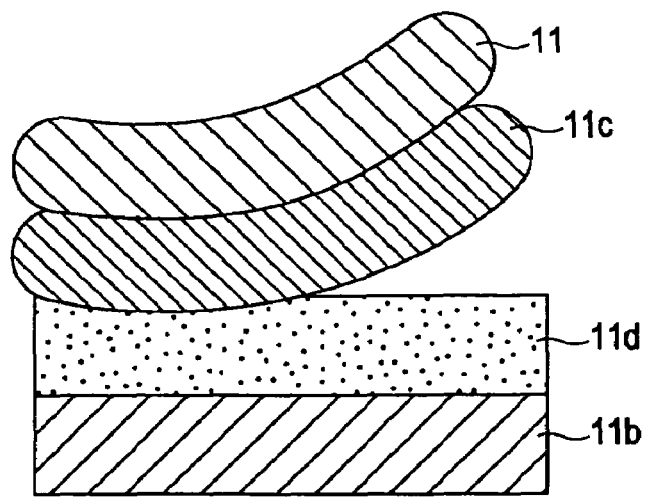

FIG. 11A shows the configuration in which the peel layer 11c and the light reflecting layer 11 are laminated on the base film 11b. In this peel film, the peel layer 11c is separated from the base film 11b.

The peel layer 11c is preferably composed of a material having a high peeling property, for example, a fluorocarbon resin, an acrylic resin, or an epoxy resin. The peel layer 11c also desirably has high adhesiveness. Furthermore, the peel layer 11c is used as a material for constituting a screen and thus preferably has flame proofness and self-extinguishing property. Examples of a base material include PI, PPS, PES, PC, aramid, and the like.

It is also effective to impart a release property to the base film, in order to increase the release property. For example, in order to increase the release property from the peel layer, the surface of the base film 11b may be coated with a silicon-based resin or a fluorine-based resin. Since a screen is also desired to have flame retardancy, the peel layer 11c more preferably contains as a flame retarder a non-halogen, metal hydrate, phosphorus, silicone, halogen, chlorine, or bromine-based material.

FIG. 11B shows a configuration in which an adhesive layer 11d, a peel layer 11c, and a light reflecting layer 11 are laminated on a base film 11b. In this peel film, the peel layer 11c is peeled from the adhesive layer 11d.

The adhesive force between the adhesive layer 11d and the peel layer 11c is desired to be lower than that at the interface between the light reflecting layer 11 and the peel layer 11c, the interface between the light reflecting layer 11 and the light absorbing layer 22, and the interface between the light absorbing layer 22 and the light diffusing layer 13. After the light reflecting layer 11 and the peel layer 11c are transferred to the light diffusing layer side, the adhesive layer 11d preferably remains on the base film 11b.

In producing a reflective screen having the basic configuration 2, either of the basic configurations shown in FIGS. 11A and 11B may be used.

(Experiment of Basic Configuration 2)

An Al metal film was formed on the peel layer 11c composed of aramid resin (thickness 4 μm) in a peel film having the configuration shown in FIG. 11B including the base film 11b composed of a PET film (thickness 188 μm), the adhesive layer 11d composed of an acrylic micro adhesive (thickness 25 μm), and the peel layer 11c. Then, the light diffusing layer 13 (thickness 50 μm) was bonded to the peel film through the light absorbing layer 22 (thickness 38 μm) having adhesiveness. Then, the PET film and the adhesive layer 11d were peeled from the laminate of the peel layer 11c, the light reflecting layer 11, the light absorbing layer 22, and the light diffusing layer 13. As a result, it was confirmed that a reflective screen of 100 μm or less in thickness is formed without damage to each of the layers.

(Improvement in Winding Shaft of Take-up Reflective Screen)

A take-up reflective screen includes a cylindrical winding shaft provided at an end of a reflective screen so that the reflective screen is retracted by winding on the winding shaft and extended by unwinding from the winding shaft. In this case, during use, the reflective screen is unwound from the rotatable winding shaft to form a plane capable of projection.

Figure 12:
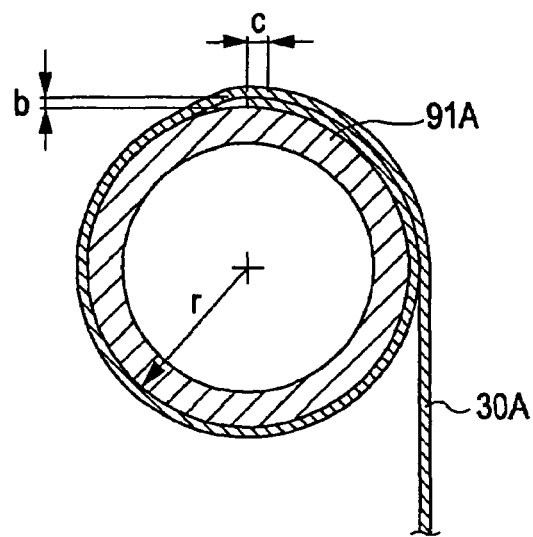
FIG. 12 is an enlarged view (1) showing a state in which a general take-up reflective screen is partially taken up.

In a general take-up reflective screen, an end of the screen is bonded and fixed directly to a winding shaft with an adhesive tape or the like. FIG. 12 is an enlarged view showing a state in which a reflective screen is partially wound on a winding shaft. A winding shaft 91A has a hollow cylindrical shape having a predetermined wall thickness and a round sectional form. In FIG. 12, r denotes the radius of the winding shaft 91A, x denotes the rotational center of the winding shaft 91A, b denotes the total thickness of the reflective screen bonded to the winding shaft 91A and the adhesive tape, and c denotes the bonded surface between the winding shaft 91A and the screen base.

In the general reflective screen (e.g., a cloth screen) having the configuration shown in FIG. 12, winding and unwinding may be performed with no problem, and the image display surface of the reflective screen is not affected by the winding. However, in the reflective screen 10A, 10B, 10C, 30A, 30B, or 30C (30A shown in FIG. 12) according to any one of the embodiments of the invention, the image display surface of the reflective screen is affected by the winding, thereby causing a problem in image display.

Figure 13:
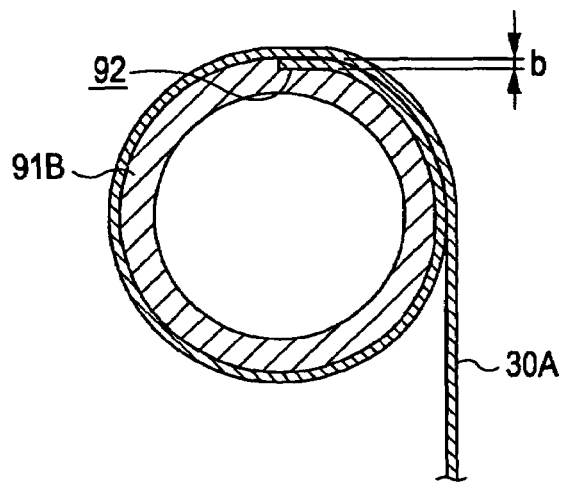
FIG. 13 is an enlarged view (2) showing a state in which a general take-up reflective screen is partially taken up.
Figure 14:
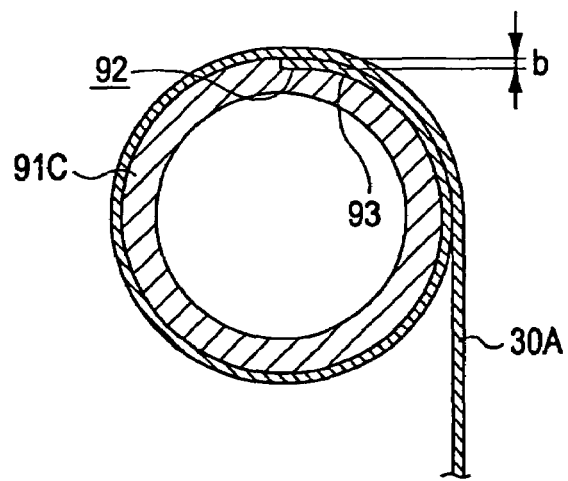
FIG. 14 is an enlarged view (3) showing a state in which a general take-up reflective screen is partially taken up.

In other words, in any one of the reflective screen 10A, 10B, 10C, 30A, 30B, and 30C, a synthetic resin material (PET, PP, or the like) film is used as a base, and the screen is very thin. For example, in any one of the reflective screen 10A, 10B, 10C, 30A, 30B, and 30C, the thickness is mainly occupied by the light diffusing layer 13, and the total thickness is about 50 to 150 μm. When such a reflective screen is wound by the configuration shown in FIG. 12, the bonded portion of the reflective screen projects in the radial direction of the cylinder of the winding shaft 91A as shown in FIG. 12, and thus indentations easily remain on the surface of the reflective screen. The indentation impairs the flatness and smoothness of the screen base (light diffusing layer 13), thereby significantly degrading the quality of an image projected by projection. Also, as shown in FIG. 13, even when a step 92 having a height corresponding to the thickness of a bonded portion is provided at a portion of a winding shaft 91B which is bonded to an end of a reflective screen, indentations remain. Furthermore, as in a winding shaft 91C shown in FIG. 14, even when a joint between the linear portion and the circular-arc portion of the step 92 of the winding shaft 91B is rounded (polished portion 93) by polishing, indentations still remain.

As a result of examination of the problem, the inventors have found that in order to decrease indentation in a reflective screen, it is important to not only provide a step in the peripheral surface of a winding shaft but also decrease imbalance of the stress applied to the reflective screen in a wound state. Intensive research based on this finding resulted in the achievement of the present invention.

A take-up reflective screen according to an embodiment of the invention will be described below.

Figure 15A:
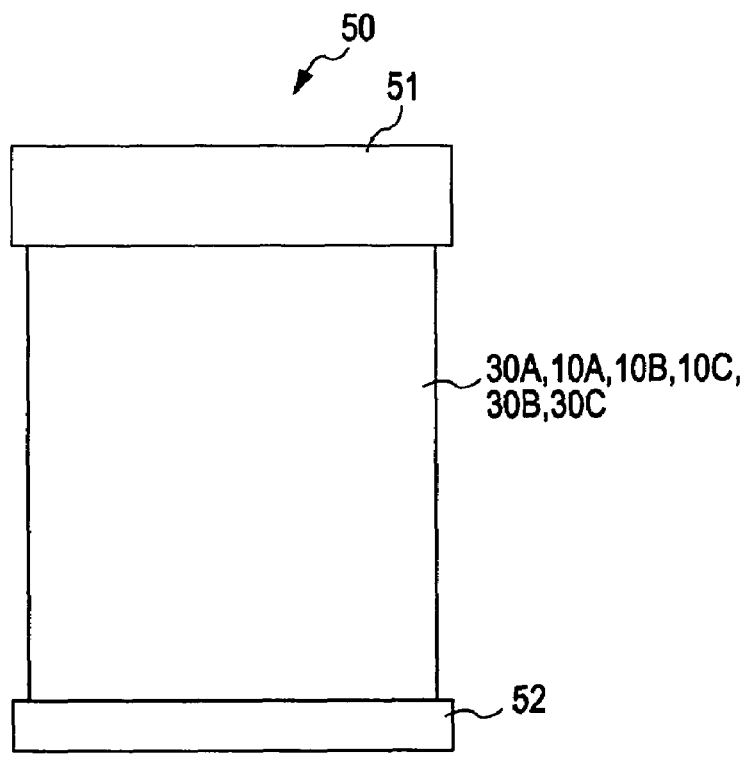
FIGS. 15A and 15B are schematic views showing a configuration of a take-up reflective screen according to an embodiment of the invention.
Figure 15B:
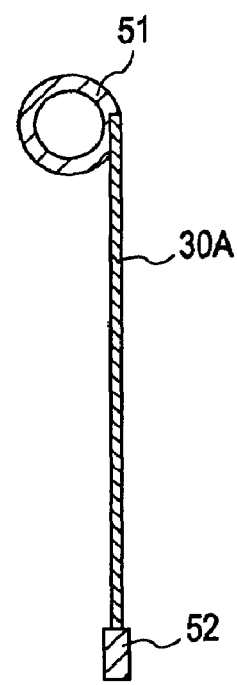

FIGS. 15A and 15B are schematic views showing the configuration of a take-up reflective screen according to an embodiment of the invention. FIG. 15A is a front view of the take-up reflective screen, and FIG. 15B a side view of the take-up reflective screen.

A take-up reflective screen 50 includes the reflective screen 10A, 10B, 10C, 30A, 30B, or 30 C according to any one of the embodiments of the invention, a cylindrical winding shaft 51 (or 61 described below) fixed to an end of the reflective screen with an adhesive tape, and a weight 52 provided at the other end of the reflective screen, for extending the screen by unwinding. The embodiment of the invention is characterized by the configuration of the winding shaft, and thus the configuration will be descried in detail below.

Figure 16:
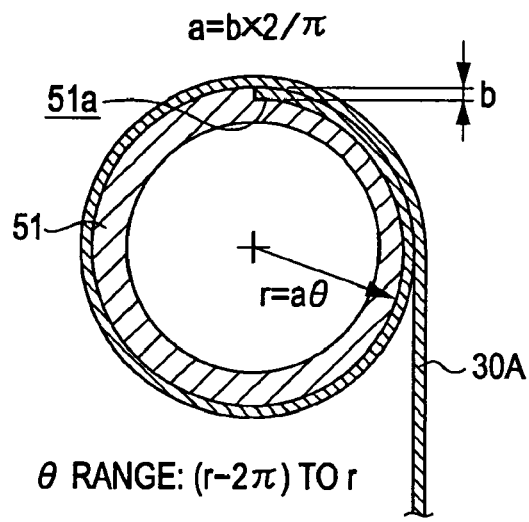
FIG. 16 is an enlarged view (1) showing a state in which a take-up reflective screen according to an embodiment of the invention is partially taken up.

FIG. 16 is an enlarged sectional view showing the state in which the reflective screen 30A of the take-up reflective screen according to the embodiment of the invention is partially wound on the winding shaft 51.

The winding shaft 51 has a cylindrical shape having a wall thickness enough to maintain its rigidity and an outer diameter of about 20 to 100 mm. Also, a step 51a having a height corresponding to the total thickness b (mm) of the reflective screen 30A and the adhesive tape is provided in the outer periphery of the winding shaft 61. Furthermore, the outer peripheral surface of the winding shaft 61 is a smooth curved surface without a large inflection point, excluding the step 51a.

The winding shaft 51 has a shape satisfying the equation given below. Namely, the winding shaft 51 has an outer peripheral surface having a continuous-curvature helical sectional shape that produces the step 51 in making a round.

(height $b_0$ of step 51a)=b $r = a \times \theta (a=b/2\pi (\text{constant}), \theta=(r_{max}-2\pi)\sim r_{max})$ wherein r is the radius (mm) of the outer periphery of the winding shaft 51, and $r_{max}$ is the outermost radius (mm) of the winding shaft 51.

The thickness of the adhesive tape is preferably 30 μm or less.

Figure 17A:
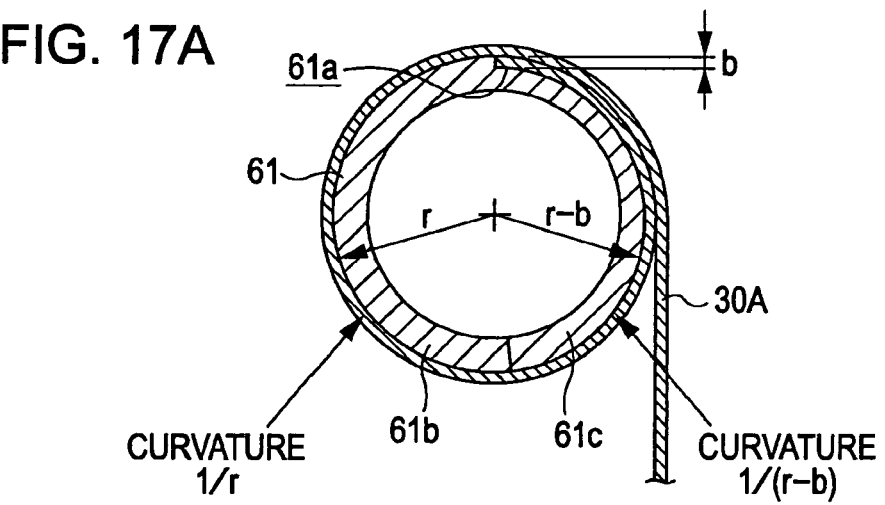
FIGS. 17A and 17B are enlarged views (2) showing a state in which a take-up reflective screen according to an embodiment of the invention is partially taken up.
Figure 17B:
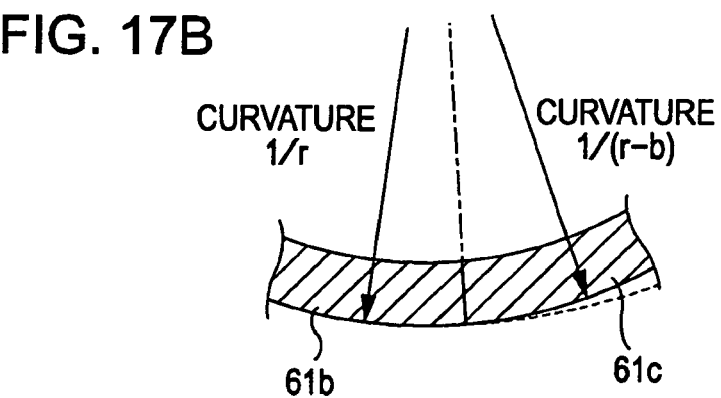

FIGS. 17A and 17B show a take-up reflective screen according to another embodiment of the invention in a state in which the reflective screen 30A is partially wound on a winding shaft 61. FIG. 17A is an enlarged sectional view of the take-up reflective screen, and FIG. 17B is an enlarged sectional view of a boundary between semicylinders 61b and 61c.

The winding shaft 61 has a cylindrical shape having a wall thickness enough to maintain its rigidity and also has a step 61a formed in the outer periphery thereof to have a thickness corresponding to the total thickness b (mm) of the reflective screen 30A and the adhesive tape. The outer peripheral surface is a continuous smooth curved surface with no large inflection point, excluding the step 61a.

The winding shaft 61 includes the step 61a having a height $b_0$ (=b) and semicylinders having different radii (spout-like shapes formed by halving a cylinder) 61b and 16c which are combined together, and the outer periphery thereof has a surface formed by tangentially connecting together both semicylinders at the step 61a as an interface. Specifically, the semicylinder 61b having an outer peripheral surface with a radius r and a curvature 1/r and the semicylinder 61c having an outer peripheral surface with a radius (r−b) and a curvature 1/(r−b) are combined together to uniformly form the step 61a having a height b in the axial direction of the winding shaft 61. In this case, the winding shaft 61 has an axial section in which a portion opposite to the step 61a in the diameter direction has a continuous smooth peripheral surface formed by the semicylinders 61b and 61c, thereby forming a curved surface without a large inflection point (FIG. 17B).

As descried above, the take-up reflective screen according to any one of the embodiments of the invention is capable of decreasing the occurrence of indentations in the reflective screen, which is the large problem of a general take-up reflective screen using the reflective screen according to any one of the embodiments of the invention. Consequently, it may be possible to easily secure the flatness and smoothness of a reflective screen and prevent a decrease in quality of a projected image.

EXAMPLES

Example 1

Examples of the invention will be described.

(1) Reflective Screen Sample

The reflective screen 10B according to the embodiment of the invention was formed according to the following procedures:

(S11) Al was deposited to a thickness of 50 nm on a PET film (thickness 100 μm) by sputtering to form the light reflecting layer 11.

Figure 18:
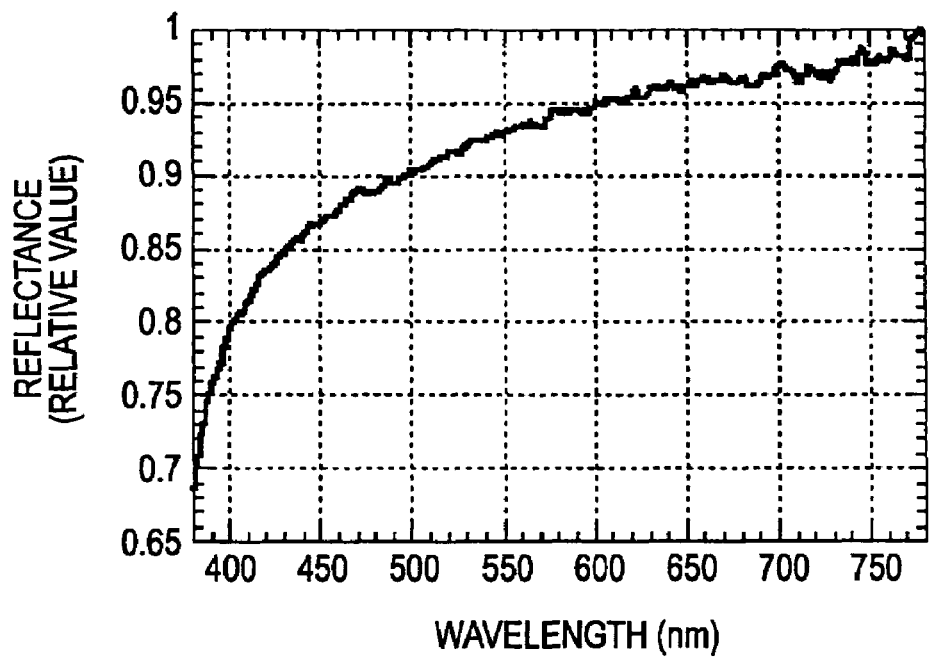
FIG. 18 is graph (1) showing the reflection properties of a light diffusing layer used in the invention.

(S12) The PET film (thickness 100 μm) was uniformly coated with an ultraviolet curable resin, and a mold having irregularity formed by sand blasting was pressed on the resin coating layer. Then, the resin coating layer was cured by ultraviolet irradiation, and the mold was removed to form, on the PET film, a resin film with the irregularity transferred thereon. The resin layer was used as the light diffusing layer 13. The light diffusing layer 13 exhibited the diffusion properties shown in FIG. 3. In other words, the diffusion angles in the A-axis direction and in the B-axis direction were 21° and 36°, respectively, and the half-luminance incidence angles on one (positive incidence angle side) of the sides and the other side (negative incidence angle side) on the A axis were 13° and 80°, respectively. On the other hand, the half-luminance incidence angels on both sides on the B axis were the same value (18°). The reflection properties of the light diffusing layer 13 were as shown in FIG. 18.

(S13) The light absorbing layer 12 containing a pigment dispersed in ah adhesive layer was prepared. The amount of the pigment added was determined according to the reflection properties of the light diffusing layer 13 to control the light absorption properties in the visible region. Table 1 shows the light absorption properties of the light absorbing layer 12 used. This table shows absorptance at each of the wavelengths of 450 nm, 500 nm, 550 nm, 600 nm, and 650 nm, and the average absorptance in each of the blue wavelength region (wavelength of 450 nm to less than 500 nm), the green wavelength region (wavelength of 500 nm to less than 600 nm) and the red wavelength region (wavelength of 600 nm to less than 650nm).

(S14) The light reflecting layer 11 and the light diffusing layer 13 were bonded together with the light absorbing layer 12 so that the Al deposited surface of the light reflecting layer 11 faced the flat surface of the light diffusing layer 13. As a result, the reflective screen was completed. In this case, the light diffusing layer 13 was disposed so that the A axis of the light diffusing layer 13 coincided with the screen vertical direction, and the side with a smaller half-luminance incidence angle (8°) on the A axis was disposed in an upper portion of the screen in the vertical direction.

TABLE 1

| Wavelength (nm) | Absorptance (%) |
|---|---|
| 450 | 18.9 |
| 500 | 22.1 |
| 550 | 23.2 |
| 600 | 25.7 |
| 650 | 24.8 |

| Color region | Mean absorptance (%) |
|---|---|
| Blue (B) (450≦, <500) | 20.3 |
| Green (G) (500≦, <600) | 23.7 |
| Red (R) (600≦, <650) | 25.0 |

Example 2

A reflective screen was formed by the same method as in Example 1 except that an acrylic transparent adhesive tape (TD06A manufactured by Tomoegawa Paper Co., Ltd.) was used instead of the light absorbing layer 12.

Example 3

Figure 19:
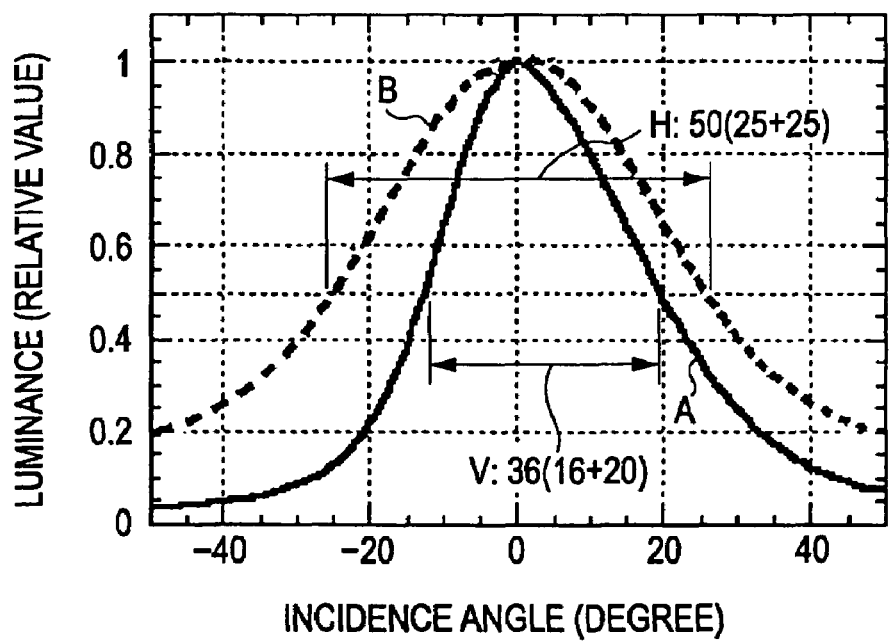
FIG. 19 is a graph (2) showing the diffusion properties of a light diffusing layer used in the invention.
Figure 20:
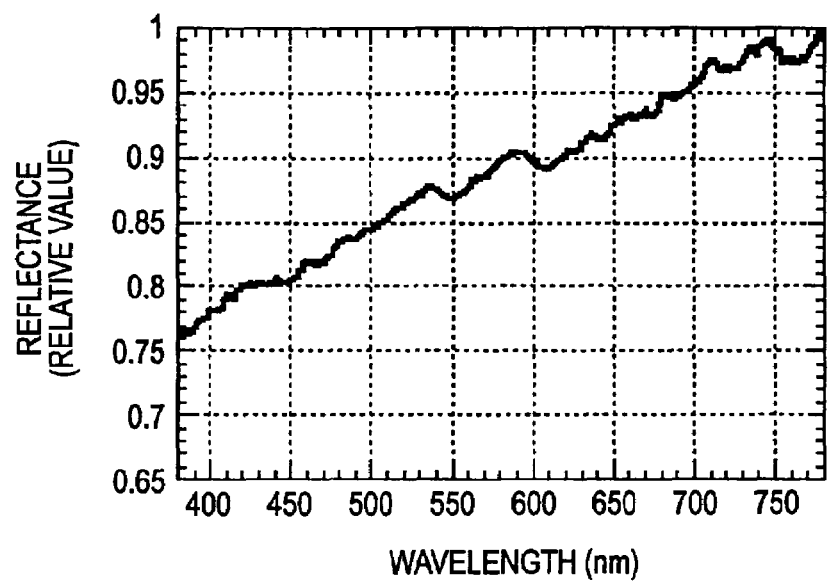
FIG. 20 is a graph (2) showing the reflection properties of a light diffusing layer used in the invention.

The reflective screen 30C according to one of the embodiments of the invention was formed according to the following procedures:

(S21) A PET film (thickness 100 μm) was uniformly coated with an ultraviolet curable resin, and a mold having irregularity formed by sand blasting was pressed on the resin coating layer. Then, the resin coating layer was cured by ultraviolet irradiation, and the mold was removed to form, on the PET film, a resin film with the irregularity transferred thereon. The resin layer was used as the light diffusing layer 13. The diffusion properties of the light diffusing layer 13 are shown in FIG. 19. In other words, the diffusion angles in the A-axis direction and in the B-axis direction were 36° and 50°, respectively, and the half-luminance incidence angles on one (positive incidence angle side) of the sides and the other side (negative incidence angle side) on the A axis were 20° and 16°, respectively. On the other hand, the half-luminance incidence angels on both sides on the B axis were the same value (25°). The reflection properties of the light diffusing layer 13 were as shown in FIG. 20.

(S22) Al was deposited to a thickness of 50 nm on the irregular surface of the light diffusing layer 13 by sputtering to form the light reflecting layer 11.

Figure 21:
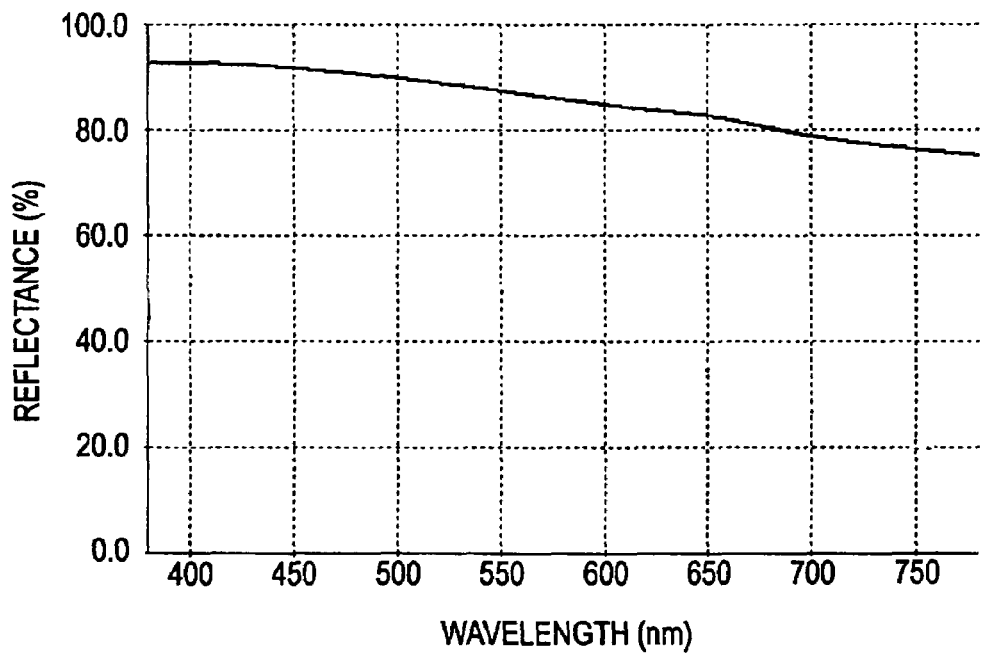
FIG. 21 is a graph showing the reflection properties of a light reflecting layer of Example 3.

(S23) SiO$_2$ was deposited on the Al. The thickness was determined according to the reflection properties (FIG. 20) of the light diffusing layer 13 to control the light reflection properties in the visible region. In this step, the thickness of SiO$_2$ was 130 nm to create the reflectance distribution shown in FIG. 21.

(S24) The light diffusing layer 13 was disposed so that the A axis of the light diffusing layer 13 coincided with the screen vertical direction, and the side with a smaller half-luminance incidence angle (16°) on the A axis was disposed in an upper portion of the screen in the vertical direction. As a result, the reflective screen 30C was completed.

Example 4

A reflective screen was formed by the same method as in Example 3 except that the light reflecting layer 11 was composed of only Al.

Comparative Example 1

A reflective screen was formed by the same method as in Example 2 except that the light reflecting layer 11 and the light diffusing layer 13 were bonded together so that the A axis of the light diffusing layer 13 coincided with the screen vertical direction, and the side with a larger half-luminance incidence angle (13°) on the A axis was disposed in an upper portion of the screen in the vertical direction.

Comparative Example 2

A reflective screen was formed by the same method as in Example 4 except that the light diffusing layer 13 was disposed so that the A axis of the light diffusing layer 13 coincided with the screen vertical direction, and the side with a larger half-luminance incidence angle (20°) on the A axis was disposed in an upper portion of the screen in the vertical direction.

(2) Evaluation Method

A projector (Sony Corporation, VPL-HS50) including a UHP lamp serving as a light source was disposed in front of a reflective screen sample, and a white image was projected on a central portion of the screen from the projector to measure a reflection spectrum from the central portion of the screen using a spectrophotometer (manufactured by JASCO Corporation, V560). Also, the white balance (xy chromaticity coordinates in a xyz-color system chromaticity diagram) of light reflected from the central portion of the screen was measured with a spectrophotometric calorimeter (manufactured by Photo Research Co., Ltd., PR650).

In addition to the projector, a halogen lamp was disposed obliquely above the reflective screen sample, and white light was projected on the central portion of the screen from the projector. At the same time, halogen light was projected as external light from the halogen lamp to measure reflection luminance of light reflected from the central portion of the screen with the spectrophotometric calorimeter. The total of reflection luminance of the projector light source and the halogen light was divided by the reflection luminance of the halogen lamp to determine the contrast (=white level/black level).

As an evaluation reference for the contrast and white balance, a standard diffusion plate (Spectralon, a reflection target manufactured by Labspere Inc.) was used.

On the basis of CIE1976 USC chromaticity diagram, the chromaticity coordinates x and y were converted to chromaticity coordinates u' and v', and a color difference was calculated by a distance in the c'v' chromaticity diagram to determine a color shift (ΔJND) on the basis of the reference of the standard diffusion plate according to the following equation:

$$\Delta JND = (\Delta u'^2 + \Delta v'^2)^{2/1}/0.004 \quad \text{(Equation 1)}$$

These results are shown in Tables 2 and 3.

Table 2 indicates that the contrast increases in the order of the standard diffusion plate, Comparative Example 1, Example 2, and Example 1. The reason why the contrast of Comparative Example 1 is higher than that of the standard diffusion plate is that the light diffusing layer 13 has a narrow diffusion angle in the screen vertical direction. The reason why the contrast of Example 2 is higher than that of Comparative Example 1 is that the half-luminance incidence angle in the upper portion of the screen is small. The reason why the contrast of Example 1 is higher than that in Example 2 is the light absorbing effect of the light absorbing layer.

Figure 22:
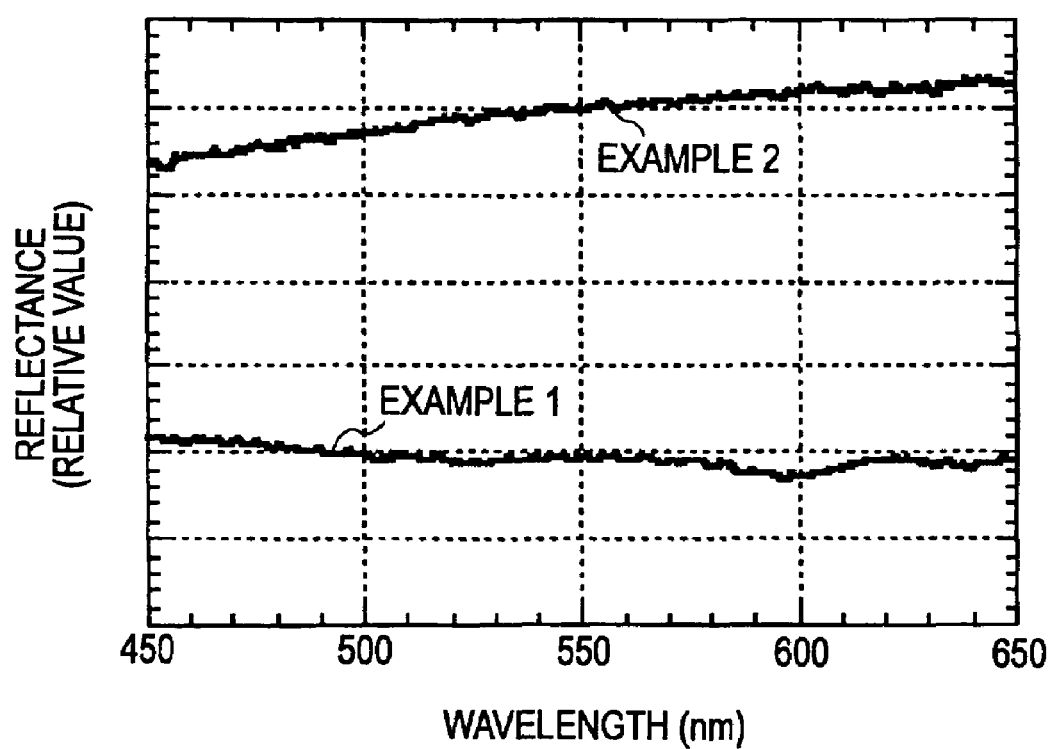
FIG. 22 is a graph showing the reflection properties of screen samples of Examples 1 and 2.

The reflection properties of the screen samples of Examples 1 and 2 are shown in FIG. 22. In Example 2, a curve of the reflection properties increases as the weight length increases, and a displayed image tends to be tinged with yellow. On the other hand, in Example 1, a curve of the reflection properties becomes more flat, and the white balance is more improved. Similarly, with respect to the evaluation result of color difference, Example 1 exhibits a small color shift.

Table 3 indicates that the contrast increases in the order of the standard diffusion plate, Comparative Example 2, Example 3, and Example 4. The reason why the contrast of Comparative Example 2 is higher than that of the standard diffusion plate is that the light diffusing layer 13 has a narrow diffusion angle in the screen vertical direction. The reason why the contrasts of Examples 3 and 4 are higher than that of Comparative Example 2 is that the half-luminance incidence angle in the upper portion of the screen is small.

Example 3 is also most satisfactory with respect to the white balance.

TABLE 2

| | Half-luminance incidence angle | | Diffusion angle | Presence | Evaluation results | | |
|---|---|---|---|---|---|---|---|
| | Screen vertical direction | | Screen | | | | Color |
| | Upper portion of screen | Lower portion of screen | horizontal direction | of color absorption | Contrast | White balance | shift (JND) |
| Example 1 | 8 | 13 | 36 | Yes | 8.2 | x: 0.255 y: 0.286 | 0.7 |
| Example 2 | 8 | 13 | 36 | No | 7.2 | x: 0.263 y: 0.305 | 2.6 |
| Comparative Example 1 | 13 | 8 | 36 | No | 6.5 | x: 0.263 y: 0.305 | 2.6 |
| Standard diffusion plate | 90 | 90 | 180 | — | 1 | x: 0.255 y: 0.290 | — |

TABLE 3

| | Half-luminance incidence angle | | Diffusion angle | Presence | Evaluation results | | |
|---|---|---|---|---|---|---|---|
| | Screen vertical direction | | Screen | of | | | Color |
| | Upper portion of screen | Lower portion of screen | horizontal direction | reflectance control | Contrast | White balance | shift (JND) |
| Example 3 | 16 | 20 | 50 | Yes | 8.7 | x: 0.250 y: 0.284 | 1.2 |
| Example 4 | 16 | 20 | 50 | No | 8.7 | x: 0.261 y: 0.283 | 1.9 |
| Comparative Example 2 | 20 | 16 | 50 | No | 7.4 | x: 0.261 y: 0.283 | 1.9 |
| Standard diffusion plate | 90 | 90 | 180 | — | 1 | x: 0.255 y: 0.290 | — |

Example 5

The reflective screen 30A according to the embodiment of the invention was formed according to the following procedures:

(S31) A PET film (thickness 100 µm) was uniformly coated with an ultraviolet curable resin, and a mold having irregularity formed by sand blasting was pressed on the resin coating layer. Then, the resin coating layer was cured by ultraviolet irradiation, and the mold was removed to form, on the PET film, a resin film with the irregularity transferred thereon. The resin layer was used as the light diffusing layer 13.

(S32) Al was deposited to a thickness of 50 nm on the irregular surface of the light diffusing layer 13 by sputtering to form the light reflecting layer 11. The light diffusing layer 13 was disposed so that the A axis of the light diffusing layer 13 coincided with the screen vertical direction, and the side with a smaller half-luminance incidence angle (A+=14°) on the A axis was disposed in an upper portion of the screen in which external light has highest strength. As a result, the reflective screen 30A was completed.

Figure 23:
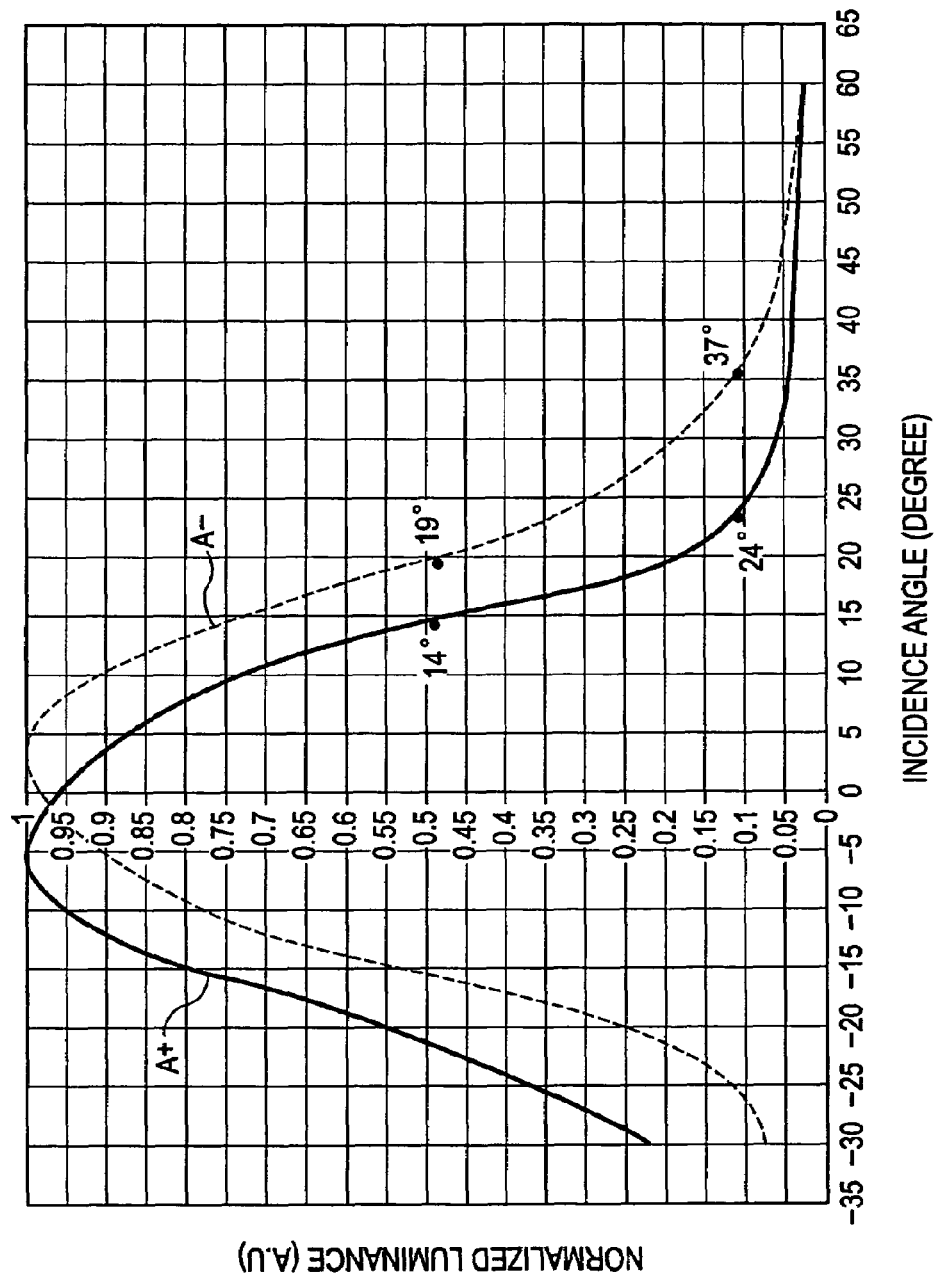
FIG. 23 is graph showing the diffusion properties of a reflective screen of Example 5.

The diffusion properties of the reflective screen 30A of this example are shown in FIG. 23. In this figure, the diffusion properties on one (positive-incidence-angle side) of the sides on the A axis are shown by a solid line curve, and the diffusion properties on the other side (negative-incidence-angle side) are shown by a dotted line curve. The luminance at each incidence angle normalized by dividing by the peak luminance is shown as ordinate.

In FIG. 23, the half-luminance incidence angle (A+) on one (positive-incidence-angle side) of the sides on the A axis is 14°, and the half-luminance incidence angle (A−) on the other side (negative-incidence-angle side) is 19°, thereby establishing the relation A+≦A−. Furthermore, the incidence angle (1/10-luminance incidence angle) on one (positive-incidence-angle side) of the sides on the A axis at which the luminance is 1/10 of the peak luminance is (A+) +10°=24°, and the 1/10-luminance incidence angle on the other side (negative-incidence-angle side) on the A axis is (A−)+18°=37°. The difference between the 1/10-luminance incidence angle and the half-luminance incidence angle one (positive-incidence-angle side) of the sides on the A axis is different from that on the other side (negative-incidence-angle side).

In this example, a comparative relative screen was prepared in which the A-axis direction of the light diffusing layer 13 coincided with the screen vertical direction, and the side with a larger half-luminance incidence angle (A−=19°) on the A axis was disposed in an upper portion of the screen in which external light has highest strength. The reflective screen of this example and the comparative reflective screen were evaluated with respect to the contrast by the above-described evaluation method. As a result, the contrast ratio of the reflective screen of this example was improved by 20% as compared with the comparative reflective screen.

Example 6

The surface shape of the reflective screen of Example 5 was examined.

Figure 24:
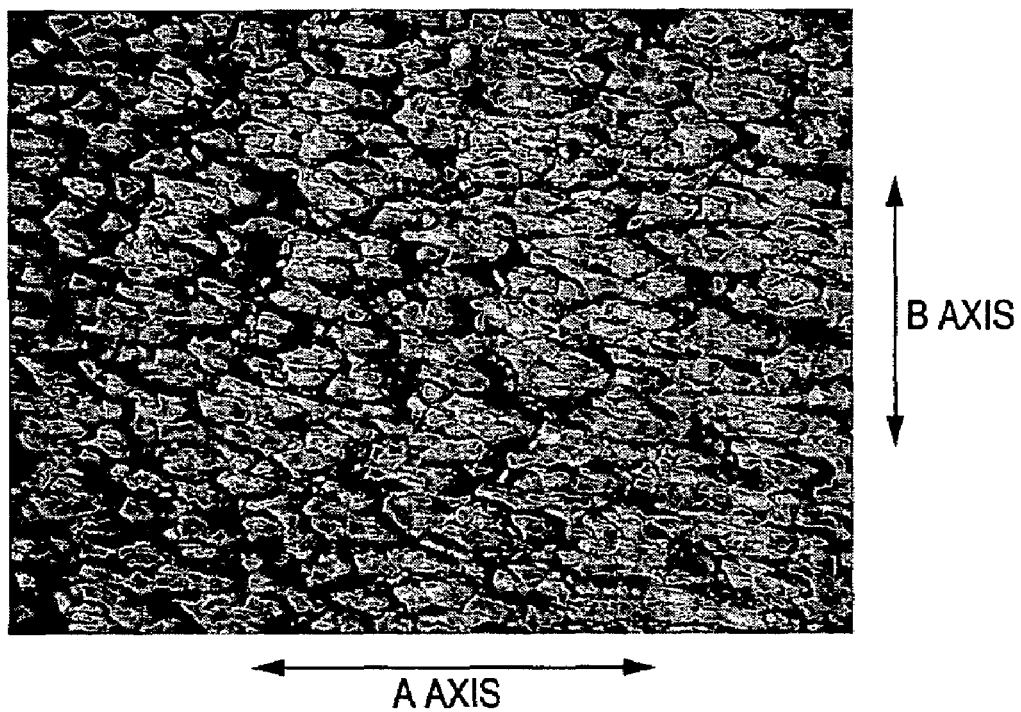
FIG. 24 is a photograph of the surface state of the reflection screen of Example 5.

FIG. 24 is a SEM photograph of the surface of a reflective screen sample of Example 5. In this photograph, the transverse direction coincides with the A-axis direction, and the longitudinal direction coincides with the B-axis direction. The sample has the reflecting layer 31 in the uppermost layer, and the surface form of the light diffusing layer 13 provided below the reflecting layer 31 is reflected in the surface form thereof.

Figure 25:
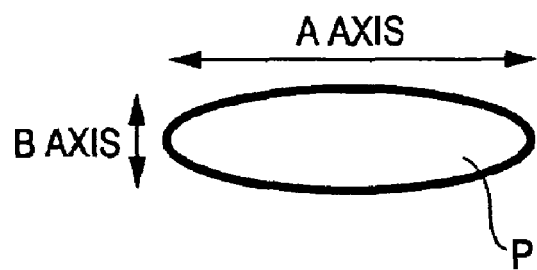
FIG. 25 is a view showing a method for measuring the size of a micro surface element p.

FIG. 24 shows the surface form of a sample in which substantially ellipsoidal elements are assembled so that the substantially ellipsoidal elements are partially exposed in the surface to form an irregular shape. The micro surface elements p including the respective exposed portions of the substantially ellipsoidal elements have random forms and/or a random arrangement. Furthermore, the long-diameter direction of each micro surface element p is the A-axis direction, and the short-diameter direction is the B-axis direction. The sizes of the micro surface elements p were measured by the method shown in FIG. 25. The results are shown in Table 4.

TABLE 4

| Sample No. | B | A (unit: µm) |
|---|---|---|
| 1 | 1.83 | 3.36 |
| 2 | 2.29 | 4.71 |
| 3 | 2.29 | 5.03 |
| 4 | 2 | 4.8 |
| 5 | 2.33 | 4.66 |
| Average | 2.14 | 4.51 |

As a result of measurement of the surface roughness of the sample. the average linear central roughness Ra was 0.7 µm. this value corresponds to the height (height in the Z direction of the micro surface element p.

Figure 26A:
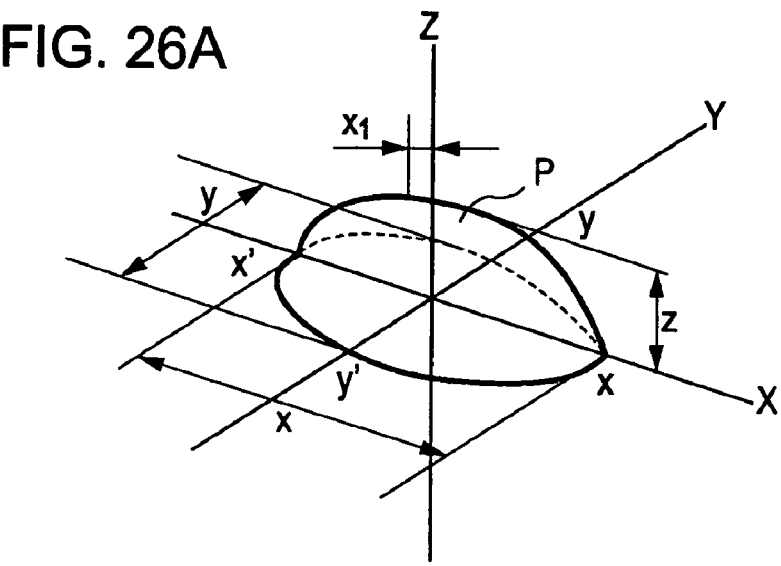
FIGS. 26A, 26B, and 26C are conceptual views showing the shape of a micro surface element p.
Figure 26B:
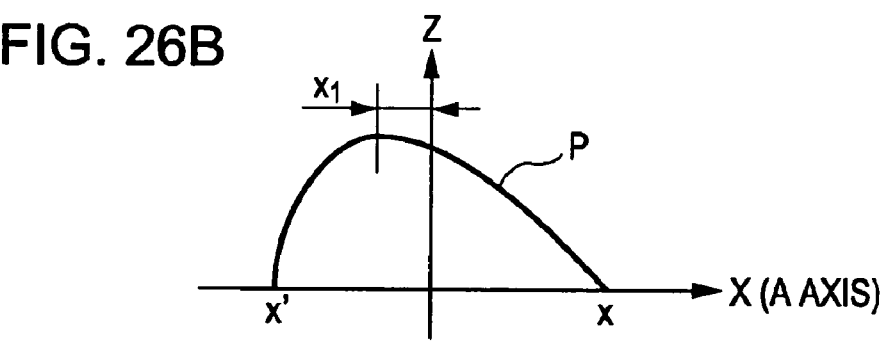
Figure 26C:
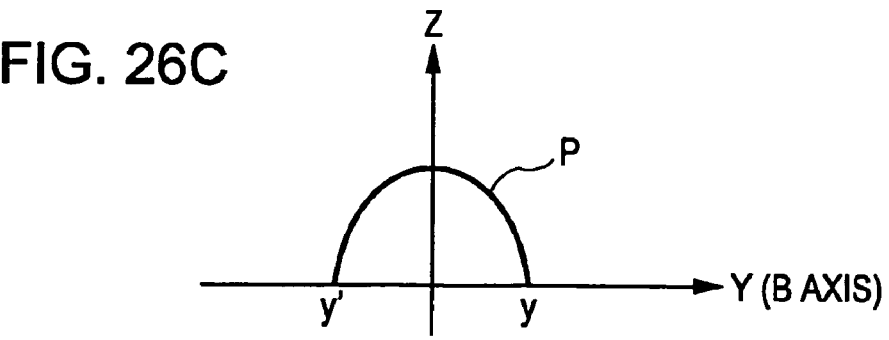

On the basis of the above-described measurement results, the shape of the micro surface elements p was determined. FIGS. 26A, 26B, and 26C are conceptual views showing the shape of a micro surface element p. FIG. 26A is a prespective view of a micro surface element p, FIG. 26B is a sectional view taken along line x-x' in FIG. 26A, and FIG. 26C is a sectional view taken along line y-y' in FIG. 26A.

The apex of the micro surface element p shifts to the position at x=x1 and y=0, not on the Z axis (x=y=0). In other words, in the x-x' sectional view of FIG. 26B, the sectional shape of the micro surface element p has an apex shifting by x1 along the X axis and is asymmetric with respect the Z axis. On the other hand, in the y-y' sectional view of FIG. 26C, the sectional shape of the micro surface element p is symmetric with respect to the Z axis.

The diffusion properties of the sample of this example were measured with a goniometer.

Figure 27:
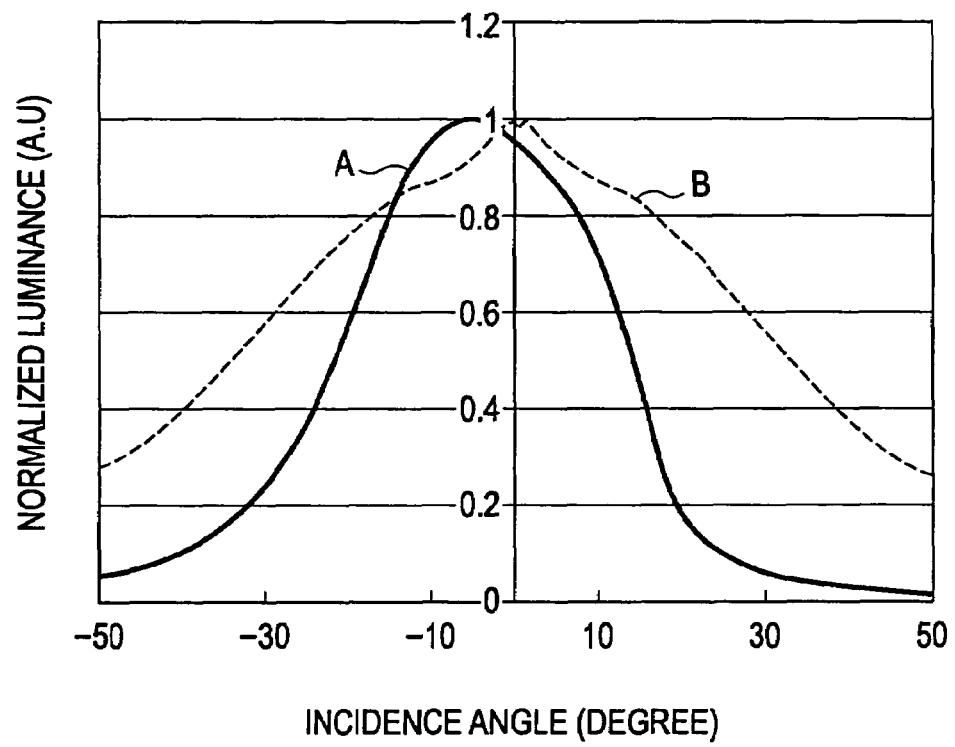
FIG. 27 is a graph showing the diffusion properties of a reflective screen of Example 6.

The results are shown in FIG. 27. In FIG. 27, a curve A shows the diffusion properties in the A-axis direction, and a curve B shows the diffusion properties in the B-axis direction. The diffusion properties in the A-axis direction are axially shifted to the negative-incidence-angle side, and the diffusion properties in the B-axis direction are symmetric with respect to the zero-incidence-angle axis.

In a comparison between the shape of the micro surface element p shown in FIGS. 26A, 26B, and 26C and the diffusion properties shown in FIG. 27, the sectional shape of the micro surface element p in the short-diameter direction (Y-axis direction) corresponds to the diffusion properties in the B-axis direction shown in FIG. 27, and the sectional shape of the micro surface element p in the long-diameter direction (X-axis direction) corresponds to the diffusion properties in the A-axis direction shown in FIG. 27. In detail, the side on which the apex of the x-x' sectional shape shifts by x1 in FIG. 26B corresponds to the diffusion properties in the A-axis direction shown in FIG. 27 which shift along the X axis. In this case, the reflective screen of this example is preferably disposed so that external light with highest strength is incident on the positive-incidence-angle side in the A-axis direction. As a result, reflection of external light toward the observer may be suppressed, and excessive scattering does not occur. Therefore, light from a projector may be efficiently reflected to the observer to display an image with a high contrast.

Example 7

On the basis of the findings obtained in Example 6, the surface shape of the light diffusing layer 13 was changed by controlling sand blasting conditions to prepare the reflective screen 30A in which the axial shift of the diffusion properties in the A-axis direction was controlled. Specifically, the axial shift of the diffusion properties in the A-axis direction was changed to 0°, 2.5°, 5°, and 7.5° to prepare samples.

Then, projector light was projected on each of the resulting samples of the reflective screen 30A under an environment in which external light was incident, and the gain, black level, and contrast ratio of reflected light were measured. The projector light was 200 1×, and external light was 100 1×. The black level was a full-white value in bright light.

The results are shown in Table 5. The table shows the tendency that as the axial shift increases, the black level decreases and the gain decreases. Under the conditions of this example, the optimum axial shift of the diffusion properties is about 2.5°.

TABLE 5

| Axial shift of diffusion properties | Gain | Black level ($cd/m^2$) | Contrast ratio |
|---|---|---|---|
| 0° | 1.25 | 3.56 | 40:1 |
| 2.5° | 1.24 | 3.30 | 42.8:1 |
| 5° | 1.10 | 3.06 | 41:1 |
| 7.5° | 1.00 | 2.90 | 39:1 |

Example 8

A take-up reflective screen according to an embodiment of the invention was formed under the following conditions:

Example 8-1

The take-up reflective screen shown in FIG. 16 was formed according to the following procedures:

(S41) The step 51a having a height ($b_0$) of 0.11 mm was formed in a concentric circular winding shaft φ45.

(S42) Then, the winding shaft formed in step S41 was formed into a continuous-curvature helical shape having a radius r of (a×θ) by discharge processing, wherein a was 0.11/(2π).

(S43) An end of the reflective screen 30A (thickness ($t_1$) of 0.10 mm) formed in Example 6 was fixed to the step 51a with an adhesive tape (thickness ($t_2$) of 0.01 mm).

(S44) A weight of 0.04 MPa was added to the other end of the reflective screen 30A, and the reflective screen 30A was wound on the winding shaft 51 by rolling the rotatable winding shaft 51.

Example 8-2

The take-up reflective screen shown in FIG. 17 was formed according to the following procedures:

(S51) The semicylinder 61b having a radius r of 25.5 mm and a curvature of 1/25.5 and the semicylinder 61b having a radius (r−$b_0$) of 25.37 mm and a curvature of 1/25.37 were combined together to form the step 61a having the height ($b_0$) of 0.11 mm corresponding to the total thickness of the reflective screen and a join member, resulting in the winding shaft 61 (the shape shown in FIG. 17).

(S52) An end of the reflective screen 30A (thickness ($t_1$) of 0.10 mm) formed in Example 6 was fixed to the step 61a with an adhesive tape (thickness ($t_2$) of 0.01 mm).

(S53) A weight of 0.04 MPa was added to the other end of the reflective screen 30A, and the reflective screen 30A was wound on the winding shaft 61 by rolling the rotatable winding shaft 61.

Example 8-3

A take-up reflective screen was formed under the same conditions as in Example 8-1 except that the height ($b_0$) of the step 51a was 0.13 mm, and the thickness ($t_2$) of the adhesive tape was 0.03 mm.

Example 8-4

Figure 28A:
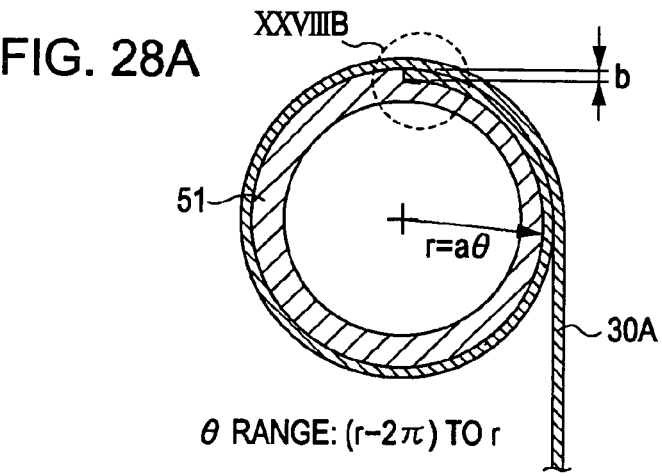
FIGS. 28A and 28B are schematic views showing a configuration of a take-up reflective screen of Example 8-4.
Figure 28B:
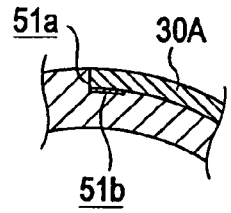

A take-up reflective screen was formed under the same conditions as in Example 8-1 except that a notch 51b (FIG. 28) was formed in a portion of the step 51a to which an end of the reflective screen 30A was bonded.

Comparative Example 8-1

Figure 29A:
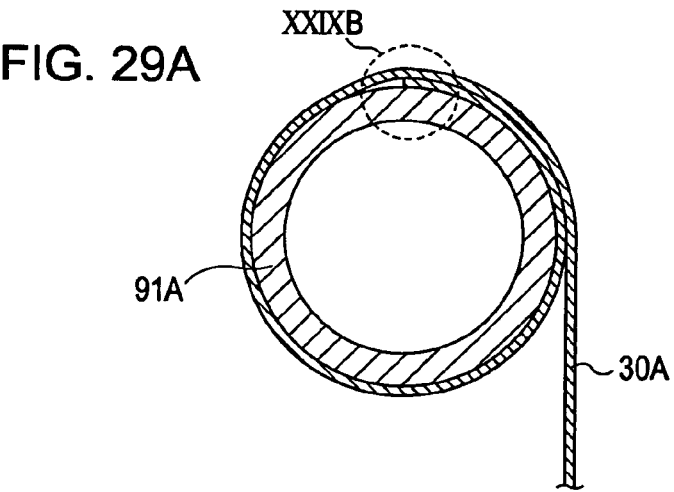
FIGS. 29A and 29B are schematic views showing a configuration of a take-up reflective screen of Comparative Examples 8-1.
Figure 29B:
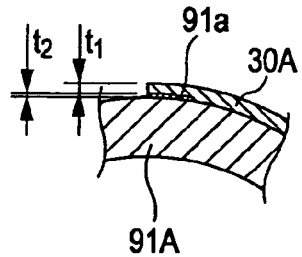

The take-up reflective screen shown in FIG. 29 was formed according to the following procedures:

(S61) An end of the reflective screen 30A (thickness ($t_1$) of 0.10 mm) formed in Example 6 was fixed to the outer peripheral surface of a winding shaft 91A including a concentric circular shaft φ45 with an adhesive tape (thickness ($t_2$) of 0.01 mm) 91a.

(S62) A weight of 0.04 MPa was added to the other end of the reflective screen 30A, and the reflective screen 30A was wound on the winding shaft 91A by rolling the rotatable winding shaft 91A.

Comparative Example 8-2

The take-up reflective screen shown in FIG. 13 was formed according to the following procedures:

(S71) A step 92 having a height ($b_0$) of 0.11 mm was formed in a concentric circular shaft φ45 (winding shaft 91B).

(S42) An end of the reflective screen 30A (thickness ($t_1$) of 0.10 mm) formed in Example 6 was fixed to the step 92 with an adhesive tape (thickness ($t_2$) of 0.01 mm).

(S43) A weight of 0.04 MPa was added to the other end of the reflective screen 30A, and the reflective screen 30A was wound on the winding shaft 91B by rolling the rotatable winding shaft 91B.

Comparative Example 8-3

A take-up reflective screen was formed under the same conditions as in Example 8-1 except that the height ($b_0$) of the step 51a was 0.15 mm, and the thickness ($t_2$) of the adhesive tape was 0.05 mm.

Comparative Example 8-4

Figure 30A:
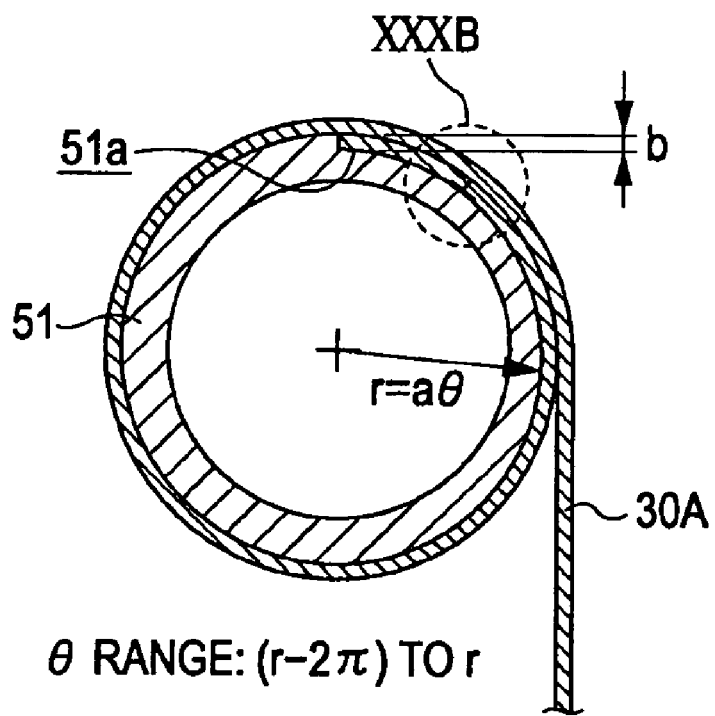
FIGS. 30A and 30B are schematic views showing a configuration of a take-up reflective screen of Comparative Example 8-4.
Figure 30B:
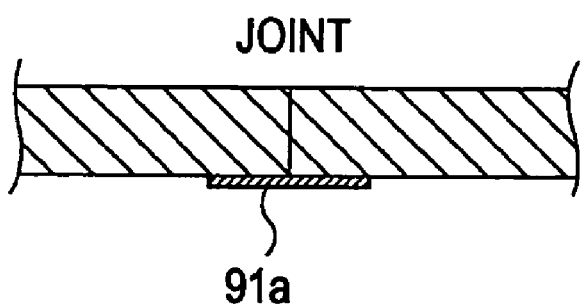

A take-up reflective screen was formed under the same conditions as in Example 8-1 except that the reflective screen 30A was cut at an intermediate position in the end portion as shown in FIG. 30, and the both ends were bonded together with an adhesive tape 91a.

Each of the resultant samples was maintained at 45° C. for 60 hours in the state in which the reflective screen 30A was wound on the winding shaft. Then, the reflective screen 30A was unwound to measure the state of indentations. The indentations were measured by applying fluorescent lamp light of 10 1× to the reflective screen 30A and measuring the luminance of reflected light with a detector.

The evaluation results are shown in Table 6.

In Examples 8-1 to 8-4, luminance differences due to the occurrence of indentations were suppressed to 50 or less relative to that in Comparative Examples 8-1 to 8-4. As a result, the flatness and smoothness of the screen were maintained, thereby preventing a decrease in quality of projected images.

TABLE 6

| | $t_1$ (mm) | $t_2$ (mm) | $b_0$ (mm) | $r_{max}$ (mm) | Factor a | Luminance difference |
|---|---|---|---|---|---|---|
| Example 8-1 | 0.10 | 0.01 | 0.11 | 22.5 | 0.11/2π | 30 |
| Example 8-2 | 0.10 | 0.10 | 0.11 | 22.5 | — | 50 |
| Example 8-3 | 0.10 | 0.03 | 0.13 | 22.5 | 0.13/2π | 50 |
| Example 8-4 | 0.10 | 0.01 | 0.11 | 22.5 | 0.11/2π | 30 |
| Comparative Example 8-1 | 0.10 | 0.01 | 0 | 22.5 | — | 160 |
| Comparative Example 8-2 | 0.10 | 0.01 | 0.11 | 22.5 | — | 150 |
| Comparative Example 8-3 | 0.10 | 0.05 | 0.15 | 22.5 | 0.15/2π | 120 |
| Comparative Example 8-4 | 0.10 | 0.01 | 0.11 | 22.5 | 0.11/2π | >150 |

$t_1$: thickness of reflective screen
$t_2$: thickness of adhesive tape
$b_0$: height of step
$r_{max}$: outermost radius It should be understood by those skilled in the art that various modifications, combinations, sub-combinations and alterations may occur depending on design requirements and other factors insofar as they are within the scope of the appended claims or the equivalents thereof.

What is claimed is:

1. A reflective screen comprising:
a light diffusing layer adapted to receive external light;
a light reflecting layer provided on the light diffusing layer, wherein the light diffusing layer is composed of a resin having irregularity in a surface thereof, and the irregular surface of the light diffusing layer is directly reflected in the surface of the light reflecting layer; and
wherein the light diffusing layer has a diffusion property that in one (A axis) of two perpendicular axial directions on a light diffusion plane, upon the light diffusing layer receiving external light, a luminance distribution curve versus incidence angle is asymmetric with respect to a zero-incidence-angle axis, and when a side with a small incidence angle on the A axis (half-luminance incidence angle) faces in a direction in which external light has a highest strength, luminance of the diffusing layer is half of a peak luminance.

2. The reflective screen according to claim 1, wherein on a side of the light diffusing layer in which a half-luminance incidence angle on the A axis is small, the light diffusing layer has a property that a luminance in the direction normal to a screen plane is 1/10 or less of the peak luminance at an incidence angle of a sum of the half-luminance incidence angle and an angle of about 0 to 20 degrees.

3. The reflective screen according to claim 2, wherein on a side of the light diffusing layer in which the half-luminance incidence angle on the A axis is large and in an other axial direction of the two perpendicular axial directions of the light diffusion plane, the light diffusing layer has a property that the luminance in the direction normal to the screen plane is 1/10 or less of the peak luminance at an incidence angle of the sum of the half-luminance incidence angle and an angle of about 0 to 20 degrees.

4. The reflective screen according to claim 1, wherein the light diffusing layer has a diffusion property that the peak luminance in an A-axis direction shifts to a side in which a half-luminance incidence angle is large on the A axis.

5. The reflective screen according to claim 1, wherein the light diffusing layer is disposed so that an A axis direction coincides with a vertical direction of the screen, and a side with a small half-luminance incidence angle is located in an upper portion of the screen in the vertical direction.

6. The reflective screen according to claim 1, wherein a diffusion angle in a horizontal direction of the screen is different from that in a vertical direction of the screen.

7. The reflective screen according to claim 1, wherein a surface of the light diffusing layer has irregularity in a form in which micro surface elements each including a part of a substantially ellipsoidal element are assembled so that the micro surface elements have random sizes and/or a random arrangement.

8. The reflective screen according to claim 7, wherein the micro surface elements have a concave or convex shape asymmetric with respect to a normal line to the screen plane.

9. The reflective screen according to claim 7, wherein an irregularity pitch of the surface of the light diffusing layer is 1 mm or less.

10. The reflective screen according to claim 1, wherein an irregularity shape of the surface of the light diffusing layer is formed by transferring a shape of a mold surface formed by sand blasting.

11. The reflective screen according to claim 10, wherein the irregularity shape of the surface of the light diffusing layer is controlled by injection of an abrasive material from a blast gun at an angle with respect to the mold surface in the sand blasting.

12. The reflective screen according to claim 1, wherein a surface of the light reflecting layer is composed of Al, Ag, Ti, Nb, Ni, Cr, Fe, or an alloy thereof of the materials listed.

13. The reflective screen according to claim 1, further comprising a light absorbing layer provided on the light reflecting layer, for absorbing part of transmitted light.

14. The reflective screen according to claim 13, wherein light absorption properties of the light absorbing layer are controlled according to reflection properties of the light diffusing layer.

15. The reflective screen according to claim 1, wherein the light reflecting layer includes an optical laminated film containing a metal film and a metal oxide thin film.

16. The reflective screen according to claim 15, wherein reflection properties of the light reflecting layer are controlled according to reflection properties of the light diffusing layer.

17. The reflective screen according to claim 15, wherein the light reflecting layer has a light reflection property represented by a relation of (reflectance in blue wavelength region)>(reflectance in green wavelength region)>(reflectance in red wavelength region).

18. The reflective screen according to claim 17, wherein the blue wavelength region ranges from 450 nm to less than 500 nm, the green wavelength region ranges from 500 nm to less than 600 nm, and the red wavelength region ranges from 600 nm to less than 650 nm.

19. The reflective screen according to claim 15, wherein the metal oxide thin film is a dielectric film composed of $Nb_2O_5$, $TiO_2$, $Ta_2O_5$, $Al_2O_3$, or $SiO_2$, or a conductive film composed of $In_2O_3$, $SnO_2$, ZnO, an $In_2O_3$—$SnO_2$ compound, or a material doped with any one of these metals.

20. A take-up reflective screen comprising:
the reflective screen according to claim 1, further comprising:
a cylindrical winding shaft fixed to one end of the reflective screen;
wherein an outer peripheral surface of the winding shaft has a step corresponding to a total thickness of the reflective screen and a joint member, and the outer peripheral surface is a continuous surface, excluding the step, satisfying the following equation:

$$r = a \times \theta$$

(wherein $a=b/2\pi$(constant), $\theta=(r_{max}-2\pi)\sim r_{max}$, b is a height of the step, r is the radius of the outer peripheral surface of the winding shaft, and $r_{max}$ is an external radius (mm) of the winding shaft).

21. A take-up reflective screen comprising:
the reflective screen according to claim 1, further comprising:
a cylindrical winding shaft fixed to one end of the reflective screen;
wherein an outer peripheral surface of the winding shaft includes a peripheral surface of a semicylinder having a radius r and a curvature 1/r and a peripheral surface of a semicylinder having a radius (r−b) and a curvature 1/(r−b), both semicylinders being combined together to form a step having a height b corresponding to a total thickness of the reflection screen and a joint member.

* * * * *